United States Patent
Yadav et al.

(10) Patent No.: US 12,497,908 B2
(45) Date of Patent: Dec. 16, 2025

(54) TURBINE ENGINE INCLUDING A FAN ASSEMBLY HAVING A DAMPER

(71) Applicant: General Electric Company, Schenectady, NY (US)

(72) Inventors: Abhijeet Yadav, Bengaluru (IN); Nicholas J. Kray, Mason, OH (US); Nitesh Jain, Bengaluru (IN); Brandon W. Miller, Middletown, OH (US); Ravindra Shankar Ganiger, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/603,694

(22) Filed: Mar. 13, 2024

(65) Prior Publication Data

US 2025/0290431 A1    Sep. 18, 2025

(51) Int. Cl.
  *F01D 25/04*    (2006.01)
  *F02C 3/04*    (2006.01)
(52) U.S. Cl.
  CPC .............. *F01D 25/04* (2013.01); *F02C 3/04* (2013.01); *F05D 2260/96* (2013.01)
(58) Field of Classification Search
  CPC .............................. B64C 11/008; B64C 11/06
  See application file for complete search history.

(56) References Cited

U.S. PATENT DOCUMENTS

| | | | | |
|---|---|---|---|---|
| 2,225,929 | A * | 12/1940 | Sarazin | F16F 15/14 74/574.3 |
| 2,683,494 | A | 7/1954 | Chilton | |
| 5,118,256 | A * | 6/1992 | Violette | F16C 27/066 416/239 |
| 5,415,527 | A * | 5/1995 | Godwin | F16C 25/06 416/220 A |
| 8,845,270 | B2 | 9/2014 | Nordstrom | |
| 9,068,574 | B2 | 6/2015 | Boston et al. | |
| 10,072,510 | B2 * | 9/2018 | Miller | F01D 7/00 |
| 10,753,391 | B1 * | 8/2020 | Smedresman | F16F 15/0237 |
| 11,199,196 | B2 | 12/2021 | Breen | |
| 11,913,408 | B1 * | 2/2024 | Daggett | B64C 11/06 |
| 2018/0290728 | A1 * | 10/2018 | Violette | B64C 11/06 |

(Continued)

FOREIGN PATENT DOCUMENTS

| | | |
|---|---|---|
| FR | 3127269 A1 | 3/2023 |
| FR | 3130896 A1 | 6/2023 |

(Continued)

*Primary Examiner* — David P. Olynick
(74) *Attorney, Agent, or Firm* — Venable LLP; Griffin A. A. Deadwick; Michele V. Frank

(57) ABSTRACT

A turbine engine experiences 1P vibrations. The turbine engine includes a turbo-engine, a compressor for compressing air, and a combustor for combusting fuel and the compressed air to generate combustion gases. A turbine receives the combustion gases and drives a fan assembly. The fan assembly includes a fan disk and a fan blade with a fan blade centerline axis. The fan blade is subjected to 1P loading, generating the 1P vibrations. A fan blade root fixed to the fan blade and connected to the fan disk, is aligned with the fan blade centerline axis, and conducts the 1P vibrations. A damper positioned radially between the fan blade root and the fan disk damps the 1P vibrations.

20 Claims, 9 Drawing Sheets

(56) References Cited

U.S. PATENT DOCUMENTS

| | | | | |
|---|---|---|---|---|
| 2019/0016458 A1* | 1/2019 | Kizhakkepat | ............ | B64C 27/35 |
| 2019/0093503 A1* | 3/2019 | Miller | ................... | F04D 29/323 |
| 2022/0372884 A1* | 11/2022 | Kray | ....................... | B64C 11/06 |
| 2023/0265760 A1* | 8/2023 | Kray | ....................... | F01D 25/06 |
| | | | | 415/119 |
| 2023/0286643 A1* | 9/2023 | Joudon | ..................... | F01D 7/00 |
| 2023/0303238 A1 | 9/2023 | Chakrabarti et al. | | |
| 2024/0384657 A1* | 11/2024 | Kray | ........................ | F01D 5/02 |

FOREIGN PATENT DOCUMENTS

| | | |
|---|---|---|
| FR | 3130897 A1 | 6/2023 |
| FR | 3133367 A1 | 9/2023 |
| FR | 3133368 A1 | 9/2023 |

\* cited by examiner

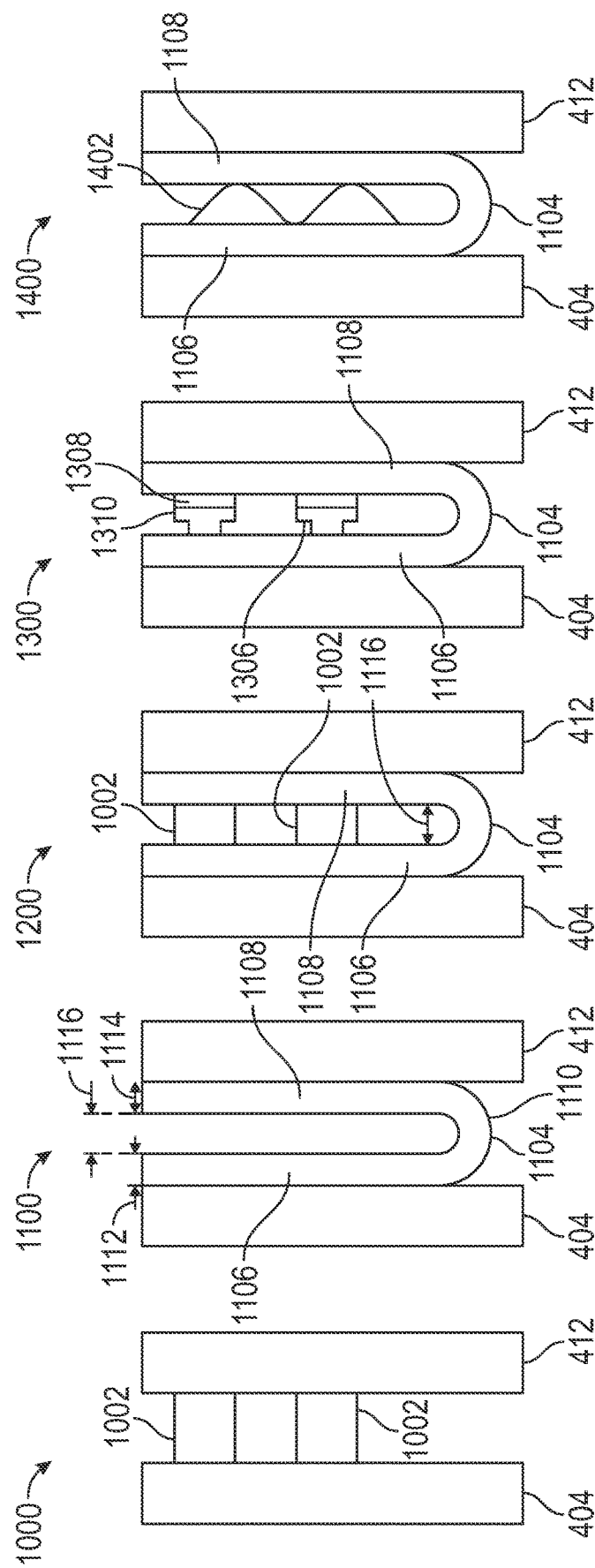

TURBINE ENGINE INCLUDING A FAN ASSEMBLY HAVING A DAMPER

TECHNICAL FIELD

The present disclosure relates generally to a turbine engine that includes a damper.

BACKGROUND

Turbine engines generally include a fan and a core section arranged in flow communication with one another. A combustor is arranged in the core section to generate combustion gases for driving a turbine in the core section of the turbine engine.

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, and/or structurally similar elements.

FIG. 10 is a schematic view of a damper, according to an embodiment of the invention.

FIG. 11 is a schematic view of a damper, according to an embodiment of the invention.

FIG. 12 is a schematic view of a damper, according to an embodiment of the invention.

FIG. 13 is a schematic view of a damper, according to an embodiment of the invention.

FIG. 14 is a schematic view of a damper, according to an embodiment of the invention.

DETAILED DESCRIPTION

Figure 1:
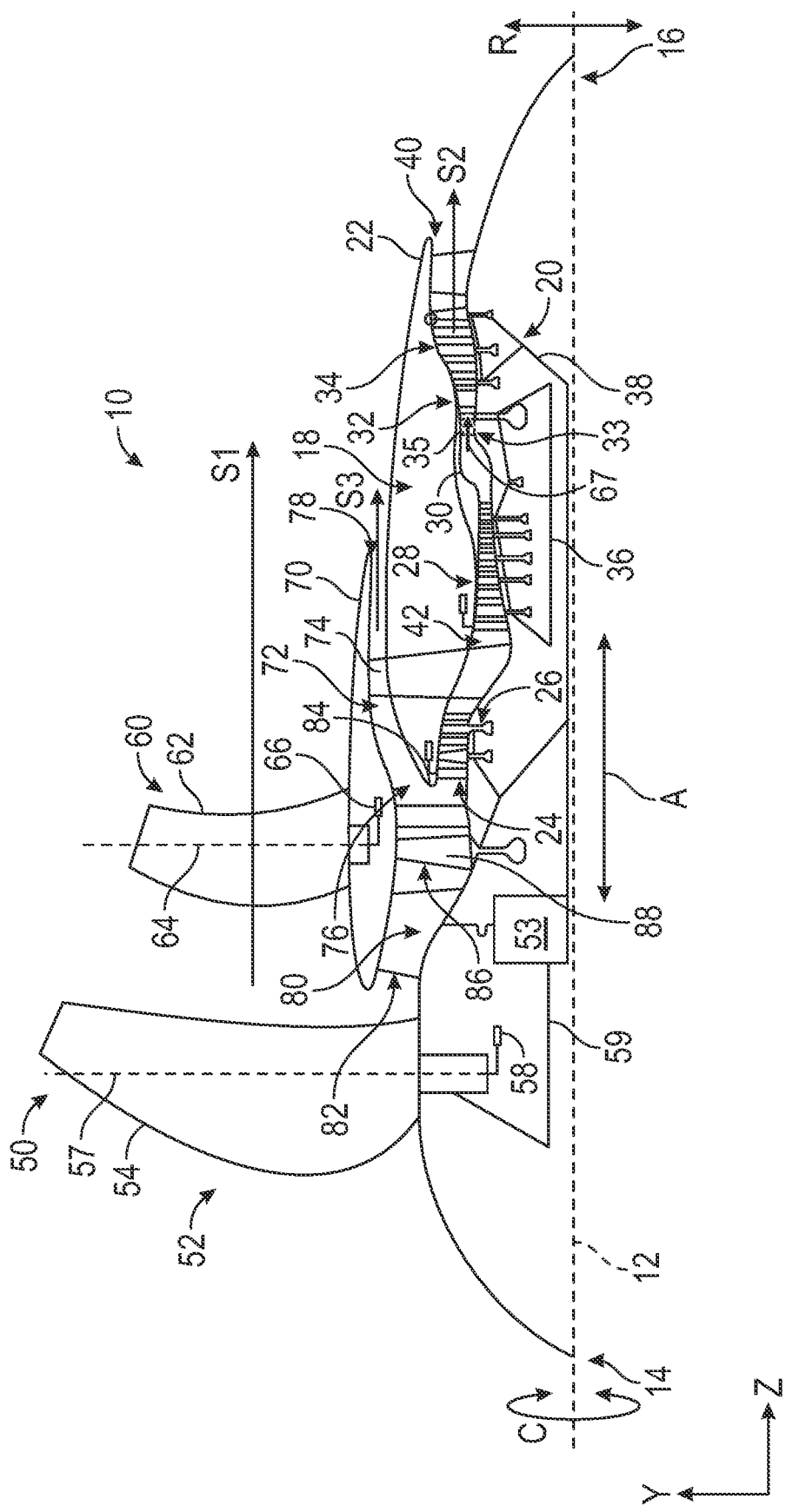
FIG. 1 shows a schematic view of an unducted, three-stream gas turbine engine, taken along a longitudinal centerline axis of the turbine engine, according to an embodiment of the present disclosure.

Features, advantages, and embodiments of the present disclosure are set forth or apparent from a consideration of the following detailed description, drawings, and claims. Moreover, the following detailed description is exemplary and intended to provide further explanation without limiting the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first," "second," and "third" may be used interchangeably to distinguish one component from another and are not intended to signify location or importance of the individual components.

The terms "forward" and "aft" refer to relative positions within a turbo-engine or a vehicle, and refer to the normal operational attitude of the turbo-engine or the vehicle. For example, with regard to a gas turbine engine, forward refers to a position closer to an engine inlet, and aft refers to a position closer to an engine nozzle or an exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," and the like, refer to both direct coupling, fixing, or attaching, as well as indirect coupling, fixing, or attaching through one or more intermediate components or features, unless otherwise specified herein.

As used herein, the terms "low," "mid" (or "mid-level"), and "high," or their respective comparative degrees (e.g., "lower" and "higher," where applicable), when used with compressor, turbine, shaft, fan, or turbine engine components, each refers to relative pressures, relative speeds, relative temperatures, and/or relative power outputs within an engine unless otherwise specified. For example, a "low-power" setting defines the engine configured to operate at a power output lower than a "high-power" setting of the engine, and a "mid-level power" setting defines the engine configured to operate at a power output higher than a "low-power" setting and lower than a "high-power" setting. The terms "low," "mid" (or "mid-level"), or "high" in such terms may additionally or alternatively be understood to be relative to minimum allowable speeds, pressures, or temperatures, or minimum or maximum allowable speeds, pressures, or temperatures relative to normal, desired, steady state, etc., operation of the engine. The singular forms "a," "an," and "the" include plural references unless the context clearly dictates otherwise.

The terms "low" and "high," or their respective comparative degrees (e.g., "lower" and "higher," where applicable), when used with the compressor, turbine, shaft, or spool components, each refers to relative pressures and/or relative speeds within an engine unless otherwise specified. For example, a "low-speed shaft" defines a component configured to operate at a rotational speed, such as a maximum allowable rotational speed, which is lower than that of a "high-speed shaft" of the engine. Alternatively, unless otherwise specified, the aforementioned terms may be understood in their superlative degree. For example, a "low-pressure turbine" may refer to the lowest maximum pressure within a turbine section, and a "high-pressure turbine" may refer to the highest maximum pressure within the turbine section. The terms "low" or "high" may additionally or alternatively be understood as relative to minimum allowable speeds and/or pressures, or minimum or maximum allowable speeds and/or pressures relative to normal, desired, steady state, etc., operation of the engine.

The term "casing" herein refers to the structure that defines an airflow path (e.g., a wall of duct, or a casing). A mounting to the casing may be a direct bolted connection or through a load bearing frame.

A "static structure" as used herein means any structural part of an engine that is non-rotating.

As used herein, the terms a "damper" is a device or a component that absorbs, reduces, or otherwise mitigates vibrations resulting from the operation of a gas turbine engine. Such vibrations may or may not include substantial relative motion. The vibrations may originate in a fan blade assembly. A damper as used herein can include devices or components for radial damping or bending damping. The dampers may damp motion or vibrations. Examples of dampers are provided in FIGS. 9 to 14.

As used herein, a "spring-mass damper system" refers to a system or assembly for mitigating vibration, and is generally defined by the equation:

$$F(t) = m\ddot{x} + c\dot{x} + kx,$$

where F is force, t is time, m is mass, x is displacement, c is damping coefficient, and k is spring constant.

As used herein, "angle of attack" refers to the upward or downward angle between the longitudinal centerline axis of the turbine engine and the direction of travel of an aircraft. For example, the angle of attack α (FIG. 2C) may be zero, or near-zero in conditions of level flight with minimal ambient wind. Alternatively, the angle of attack may be non-zero in conditions of acceleration, deceleration, climb, descent, or ambient wind.

As used herein, "yaw angle" refers to a left or a right angle between the longitudinal centerline axis of the turbine engine and the direction of travel of an aircraft. For example, the yaw angle β (FIG. 2B) may be zero, or near-zero in conditions of straight flight with minimal ambient wind. Alternatively, the yaw angle may be non-zero when maneuvering the aircraft, or when subjected to ambient crosswind.

As used herein, "inboard" and "outboard" refer to relative positions closer to the longitudinal centerline axis of the turbine engine and farther from the centerline axis of a turbine engine, respectively.

Here and throughout the specification and claims, range limitations are combined, and interchanged, such ranges are identified and include all the sub-ranges contained therein unless context or language indicates otherwise. For example, all ranges disclosed herein are inclusive of the endpoints, and the endpoints are independently combinable with each other.

One or more components of the turbo-engine described below may be manufactured or formed using any suitable process, such as an additive manufacturing process, such as a three-dimensional (3D) printing process. The use of such a process may allow such a component to be formed integrally, as a single monolithic component, or as any suitable number of sub-components. In particular, the additive manufacturing process may allow such a component to be integrally formed and include a variety of features not possible when using prior manufacturing methods. For example, the additive manufacturing methods described herein enable the manufacture of shafts having unique features, configurations, thicknesses, materials, densities, passageways, headers, and mounting structures that may not have been possible or practical using prior manufacturing methods. Some of these features are described herein.

This disclosure and various embodiments relate to a turbo-engine, also referred to as a turbine engine, a gas turbine engine, a turboprop engine, or a turbomachine. These turbo-engines can be applied across various technologies and industries. Various embodiments may be described herein in the context of aeronautical engines and aircraft machinery.

In some instances, a turbo-engine is configured as a direct drive engine. In other instances, a turbo-engine can be configured as an indirect drive engine with a gearbox. In some instances, a propulsor of a turbo-engine can be a fan encased within a fan case and/or nacelle. This type of turbo-engine can be referred to as "a ducted engine." In other instances, a propulsor of a turbo-engine can be exposed (e.g., not within a fan case or a nacelle). This type of turbo-engine can be referred to as "an open rotor engine" or an "unducted engine."

The various power levels of the turbine engine detailed herein are defined as a percentage of a sea level static (SLS) maximum engine rated thrust. Low-power operation includes, for example, less than thirty percent (30%) of the SLS maximum engine rated thrust of the turbine engine. Mid-level power operation includes, for example, thirty percent (30%) to eighty-five percent (85%) of the SLS maximum engine rated thrust of the turbine engine. High-power operation includes, for example, greater than eighty-five percent (85%) of the SLS maximum engine rated thrust of the turbine engine. The values of the thrust for each of the low-power operation, the mid-level power operation, and the high-power operation of the turbine engine are exemplary only, and other values of the thrust can be used to define the low-power operation, the mid-level power operation, and the high-power operation.

Referring now to the drawings, FIG. 1 shows a schematic view of an unducted, three-stream, gas turbine engine 10 for an aircraft, that may incorporate one or more embodiments of the present disclosure. The gas turbine engine 10 is a "three-stream engine" in that its architecture provides three distinct streams (labeled S1, S2, and S3) of thrust-producing airflow during operation, as detailed further below.

As shown in FIG. 1, the gas turbine engine 10 defines an axial direction A, a radial direction R, and a circumferential direction C. Moreover, the gas turbine engine 10 defines a longitudinal centerline axis 12, also referred to as an engine centerline axis, that extends along the axial direction A. In general, the axial direction A extends parallel to the longitudinal centerline axis 12, the radial direction R extends outward from, and inward to, the longitudinal centerline axis 12 in a direction orthogonal to the axial direction A, and the circumferential direction C extends three hundred sixty degrees (360°) around the longitudinal centerline axis 12. The gas turbine engine 10 extends between a forward end 14 and an aft end 16, e.g., along the axial direction A.

As used in the following discussion of the gas turbine engine 10, with respect to FIG. 1 (and later, to FIG. 2), the terms "axial" and "axially" refer to directions and orientations that extend substantially parallel to the longitudinal centerline axis 12 of the turbine engine. Moreover, the terms "radial" and "radially" refer to directions and orientations that extend substantially perpendicular to the longitudinal centerline axis 12 of the gas turbine engine 10. In addition, as used herein, the terms "circumferential" and "circumferentially" refer to directions and orientations that extend arcuately about the longitudinal centerline axis 12 of the turbine engine.

The gas turbine engine 10 includes a turbo-engine 20 and a fan assembly 50 positioned upstream thereof. Generally, the turbo-engine 20 includes, in serial flow order, a compressor section, a combustion section, a turbine section, and an exhaust section. Particularly, as shown in FIG. 1, the turbo-engine 20 includes an engine core 18 and a core cowl 22 that annularly surrounds the turbo-engine 20. The turbo-engine 20 and core cowl 22 define a core inlet 24 having an annular shape. The core cowl 22 further encloses and supports a low pressure (LP) compressor 26 (also referred to as a booster) for compressing the air that enters the turbo-engine 20 through core inlet 24. A high pressure (HP) compressor 28 receives compressed air from the LP compressor 26 and further increases the pressure of the air. The compressed air flows downstream to a combustor 30 where fuel is injected into the compressed air and ignited to combust, raising the temperature and the energy level of the compressed air, and generating combustion gases 67.

The combustion gases 67 flow from the combustor 30 downstream to a high pressure (HP) turbine 32. The HP turbine 32 rotationally drives the HP compressor 28 through a first shaft, also referred to as a high pressure (HP) shaft 36 (also referred to as a "high-speed shaft"). In this regard, the HP turbine 32 is rotationally and drivingly coupled with the HP compressor 28. Together, the HP compressor 28, the combustor 30, and the HP turbine 32 define the engine core 18. The combustion gases 67 then flow to a power turbine or a low pressure (LP) turbine 34. The LP turbine 34 rotationally drives the LP compressor 26 and components of the fan assembly 50 through a second shaft, also referred to as a low pressure (LP) shaft 38 (also referred to as a "low-speed shaft"). In this regard, the LP turbine 34 is rotationally and drivingly coupled with the LP compressor 26 and components of the fan assembly 50. The low-speed shaft 38 is coaxial with the high-speed shaft 36 in the embodiment of FIG. 1. After driving each of the HP turbine 32 and the LP turbine 34, the combustion gases 67 exit the turbo-engine 20 through a core exhaust nozzle 40. The turbo-engine 20 defines a core flowpath, also referred to as a core duct 42 that extends between the core inlet 24 and the core exhaust nozzle 40. The core duct 42 is an annular duct positioned generally inward of the core cowl 22 along the radial direction R.

The fan assembly 50 includes a primary fan 52. For the embodiment of FIG. 1, the primary fan 52 is an open rotor fan, also referred to as an unducted fan. However, in other embodiments, the primary fan 52 may be ducted, e.g., by a fan casing or a nacelle (not shown) circumferentially surrounding the primary fan 52. The primary fan 52 includes an array of fan blades 54 (only one shown in FIG. 1). The fan blades 54 are rotatable about the longitudinal centerline axis 12 via a fan shaft 59. As shown in FIG. 1, the fan shaft 59 is rotationally coupled with the low-speed shaft 38 via a speed reduction gearbox, also referred to as a gearbox assembly 53, e.g., in an indirect-drive configuration. The gearbox assembly 53 is shown schematically in FIG. 1. The gearbox assembly 53 includes a plurality of gears for adjusting the rotational speed of the fan shaft 59 and, thus, the primary fan 52 relative to the low-speed shaft 38 to a more efficient rotational fan speed. The gearbox assembly may have a gear ratio of 4:1 to 12:1, or 7:1 to 12:1, or 4:1 to 10:1, or 5:1 to 9:1, or 6:1 to 9:1, and may be configured in an epicyclic star or planet gear configuration. The gearbox may be a single stage or compound gearbox.

The fan blades 54 can be arranged in equal spacing around the longitudinal centerline axis 12. Each fan blade 54 has a root and a tip and a span defined therebetween. Each fan blade 54 defines a fan blade centerline axis 57. For the embodiment of FIG. 1, each fan blade 54 of the primary fan 52 is rotatable about their respective fan blade centerline axis 57, e.g., in unison with one another. One or more actuators 58 are controlled to pitch the fan blades 54 about their respective fan blade centerline axis 57. In other embodiments, each fan blade 54 is fixed or is unable to be pitched about the fan blade centerline axis 57.

The fan assembly 50 further includes a fan guide vane array 60 that includes fan guide vanes 62 (only one shown in FIG. 1) disposed around the longitudinal centerline axis 12. For the embodiment of FIG. 1, the fan guide vanes 62 are not rotatable about the longitudinal centerline axis 12. Each fan guide vane 62 has a root and a tip and a span defined therebetween. The fan guide vanes 62 can be unshrouded as shown in FIG. 1 or can be shrouded, e.g., by an annular shroud spaced outward from the tips of the fan guide vanes 62 along the radial direction R. Each fan guide vane 62 defines a central vane axis 64. For the embodiment of FIG. 1, each fan guide vane 62 of the fan guide vane array 60 is rotatable about their respective central vane axis 64, e.g., in unison with one another. One or more actuators 66 are controlled to pitch the fan guide vanes 62 about their respective central vane axis 64. In other embodiments, each fan guide vane 62 is fixed or is unable to be pitched about the central vane axis 64. The fan guide vanes 62 are mounted to a fan cowl 70.

The fan cowl 70 annularly encases at least a portion of the core cowl 22 and is generally positioned outward of the core cowl 22 along the radial direction R. Particularly, a downstream section of the fan cowl 70 extends over a forward portion of the core cowl 22 to define a fan flowpath, also referred to as a fan duct 72. Incoming air enters the fan duct 72 through a fan duct inlet 76 and exits through a fan exhaust nozzle 78 to produce propulsive thrust. The fan duct 72 is an annular duct positioned generally outward of the core duct 42 along the radial direction R. The fan cowl 70 and the core cowl 22 are connected together and supported by a plurality of struts 74 (only one shown in FIG. 1) that extend substantially radially and are circumferentially spaced about the longitudinal centerline axis 12. The plurality of struts 74 are each aerodynamically contoured to direct air flowing by the struts 74. Other struts in addition to the plurality of struts 74 can be used to connect and to support the fan cowl 70 and/or the core cowl 22.

The gas turbine engine 10 also defines or includes an inlet duct 80. The inlet duct 80 extends between an engine inlet 82 and the core inlet 24 and the fan duct inlet 76. The engine inlet 82 is defined generally at the forward end of the fan cowl 70 and is positioned between the primary fan 52 and the fan guide vane array 60 along the axial direction A. The inlet duct 80 is an annular duct that is positioned inward of the fan cowl 70 along the radial direction R. Air flowing downstream along the inlet duct 80 is split, not necessarily evenly, into the core duct 42 and the fan duct 72 by a splitter 84 of the core cowl 22. The inlet duct 80 is wider than the core duct 42 along the radial direction R. The inlet duct 80 is also wider than the fan duct 72 along the radial direction R.

The fan assembly 50 also includes a mid-fan 86. The mid-fan 86 includes a plurality of mid-fan blades 88 (only one shown in FIG. 1). The plurality of mid-fan blades 88 are rotatable, e.g., about the longitudinal centerline axis 12. The mid-fan 86 is drivingly coupled with the LP turbine 34 via the low-speed shaft 38. The plurality of mid-fan blades 88 can be arranged in equal circumferential spacing about the longitudinal centerline axis 12. The plurality of mid-fan blades 88 are annularly surrounded (e.g., ducted) by the fan cowl 70. In this regard, the mid-fan 86 is positioned inward of the fan cowl 70 along the radial direction R. The mid-fan 86 is positioned within the inlet duct 80 upstream of both the core duct 42 and the fan duct 72. A ratio of a span of a fan blade 54 to that of a mid-fan blade 88 (a span is measured from a root to tip of the respective blade) is greater than two and less than ten, to achieve the desired benefits of the third stream (S3), particularly, the additional thrust it offers to the engine, which can enable a smaller diameter fan blade 54 (benefits engine installation).

Accordingly, air flowing through the inlet duct 80 flows across the plurality of mid-fan blades 88 and is accelerated downstream thereof. At least a portion of the air accelerated by the mid-fan blades 88 flows into the fan duct 72 and is ultimately exhausted through the fan exhaust nozzle 78 to produce propulsive thrust. Also, at least a portion of the air accelerated by the plurality of mid-fan blades 88 flows into the core duct 42 and is ultimately exhausted through the core exhaust nozzle 40 to produce propulsive thrust. Generally, the mid-fan 86 is a compression device positioned downstream of the engine inlet 82. The mid-fan 86 is operable to accelerate air into the fan duct 72, also referred to as a secondary bypass passage.

During operation of the gas turbine engine 10, an initial or incoming airflow passes through the fan blades 54 of the primary fan 52 and splits into a first airflow and a second airflow. The first airflow bypasses the engine inlet 82 and flows generally along the axial direction A outward of the fan cowl 70 along the radial direction R. The first airflow accelerated by the fan blades 54 passes through the fan guide vanes 62 and continues downstream thereafter to produce a primary propulsion stream or a first thrust stream S1. A majority of the net thrust produced by the gas turbine engine 10 is produced by the first thrust stream S1.

The second airflow enters the inlet duct 80 through the engine inlet 82. The second airflow flowing downstream through the inlet duct 80 flows through the plurality of mid-fan blades 88 of the mid-fan 86 and is consequently compressed. The second airflow flowing downstream of the mid-fan blades 88 is split by the splitter 84 located at the forward end of the core cowl 22. Particularly, a portion of the second airflow flowing downstream of the mid-fan 86 flows into the core duct 42 through the core inlet 24. The portion of the second airflow that flows into the core duct 42 is progressively compressed by the LP compressor 26 and the HP compressor 28 and is ultimately discharged into the combustion section. The discharged compressed air stream flows downstream to the combustor 30 where fuel is introduced to generate combustion gases 67 or products.

The combustor 30 defines an annular combustion chamber that is generally coaxial with the longitudinal centerline axis 12. The combustor 30 receives compressed air from the HP compressor 28 via an HP compressor discharge outlet. A portion of the compressed air flows into a mixer. Fuel is injected by a fuel nozzle (omitted for clarity) to mix with the compressed air and form a fuel-air mixture that is provided to the combustion chamber for combustion. Ignition of the fuel-air mixture is accomplished by one or more igniters (omitted for clarity), and the resulting combustion gases 67 flow along the axial direction A toward, and into, a first stage turbine nozzle 33 of the HP turbine 32. The first stage turbine nozzle 33 is defined by an annular flow channel that includes a plurality of radially extending, circumferentially spaced nozzle vanes 35 that turn the combustion gases 67 so that the combustion gases 67 flow angularly and impinge upon first stage turbine blades of the HP turbine 32. The combustion gases 67 exit the HP turbine 32 and flow through the LP turbine 34, and exit the core duct 42 through the core exhaust nozzle 40 to produce a core air stream, also referred to as a second thrust stream S2. As noted above, the HP turbine 32 drives the HP compressor 28 via the high-speed shaft 36, and the LP turbine 34 drives the LP compressor 26, the primary fan 52, and the mid-fan 86 via the low-speed shaft 38.

The other portion of the second airflow flowing downstream of the mid-fan 86 is split by the splitter 84 into the fan duct 72. The air enters the fan duct 72 through the fan duct inlet 76. The air flows generally along the axial direction A through the fan duct 72 and is ultimately exhausted from the fan duct 72 through the fan exhaust nozzle 78 to produce a third stream, also referred to as a third thrust stream S3.

The third thrust stream S3 is a secondary air stream that increases fluid energy to produce a minority of total propulsion system thrust. In some embodiments, a pressure ratio of the third stream is higher than that of the primary propulsion stream (e.g., a bypass or a propeller driven propulsion stream). The thrust may be produced through a dedicated nozzle or through mixing of the secondary air stream with the primary propulsion stream or a core air stream, e.g., into a common nozzle. In certain embodiments, an operating temperature of the secondary air stream is less than a maximum compressor discharge temperature for the engine. Furthermore, in certain embodiments, aspects of the third stream (e.g., airstream properties, mixing properties, or exhaust properties), and an associated percent contribution to total thrust, are passively adjusted during engine operation or can be modified purposefully through use of engine control features (such as fuel flow, electric machine power, variable stators, variable inlet guide vanes, valves, variable exhaust geometry, or fluidic features) to adjust or to improve overall system performance across a broad range of potential operating conditions.

The gas turbine engine 10 depicted in FIG. 1 is by way of example only. In other embodiments, the gas turbine engine 10 may have any other suitable configuration. For example, in other embodiments, the primary fan 52 may be configured in any other suitable manner (e.g., as a fixed pitch fan) and further may be supported using any other suitable fan frame configuration. Alternative configurations may include a turbine engine 10 without a fan guide vane array 60 or a turbine engine 10 with rotating vanes in the fan guide vane array 60. While the following discussion is directed to an unducted configuration, other embodiments are considered, wherein the primary fan 52 can be ducted by a fan casing or a nacelle such that a bypass passage is defined between the fan casing and the fan cowl 70. Moreover, in other embodiments, any other suitable number or configuration of compressors, turbines, shafts, or a combination thereof may be provided. In still other embodiments, aspects of the present disclosure may be incorporated into any other suitable turbine engine, such as, for example, turbofan engines, propfan engines, turbojet engines, turboprop, turboshaft engines, and/or turbine engines defining two streams (e.g., a bypass stream and a core air stream).

Figure 2A:
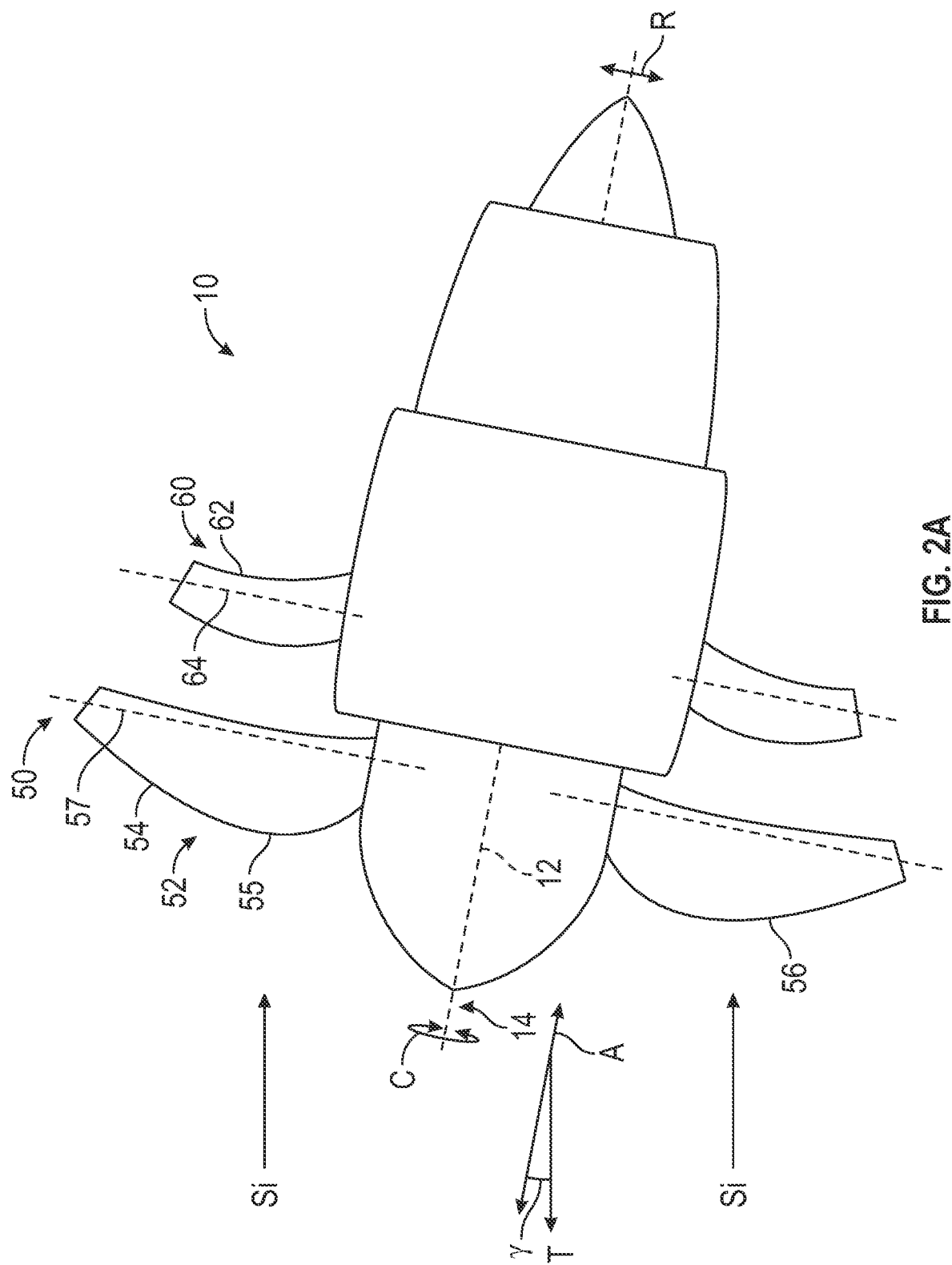
FIG. 2A shows a schematic view of an unducted, three-stream gas turbine engine, at a non-zero angle of incidence, according to an embodiment of the present disclosure.
Figure 2B:
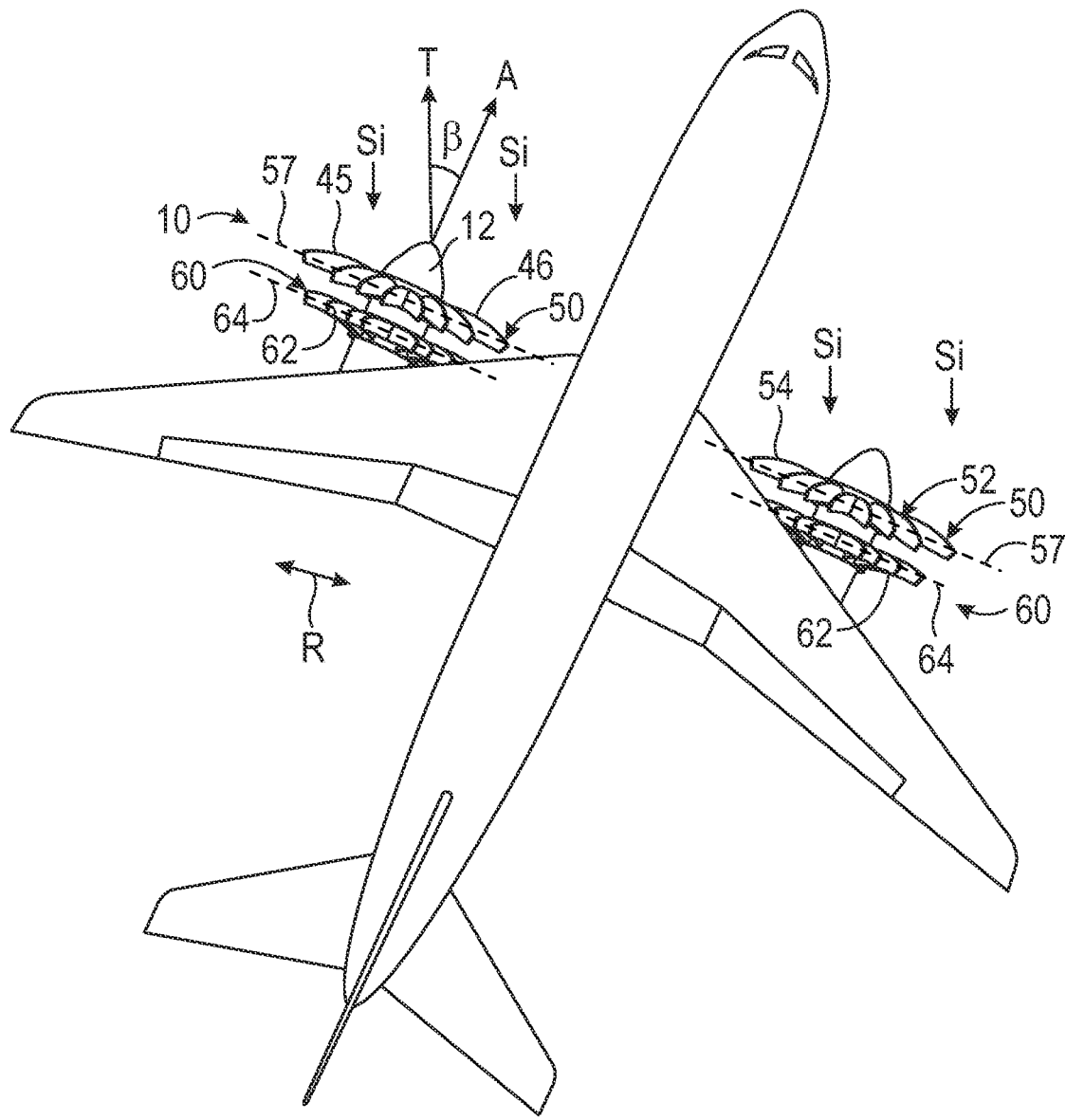
FIG. 2B shows a schematic view of an unducted, three-stream gas turbine engine, at a non-zero yaw angle, according to an embodiment of the present disclosure.
Figure 2C:
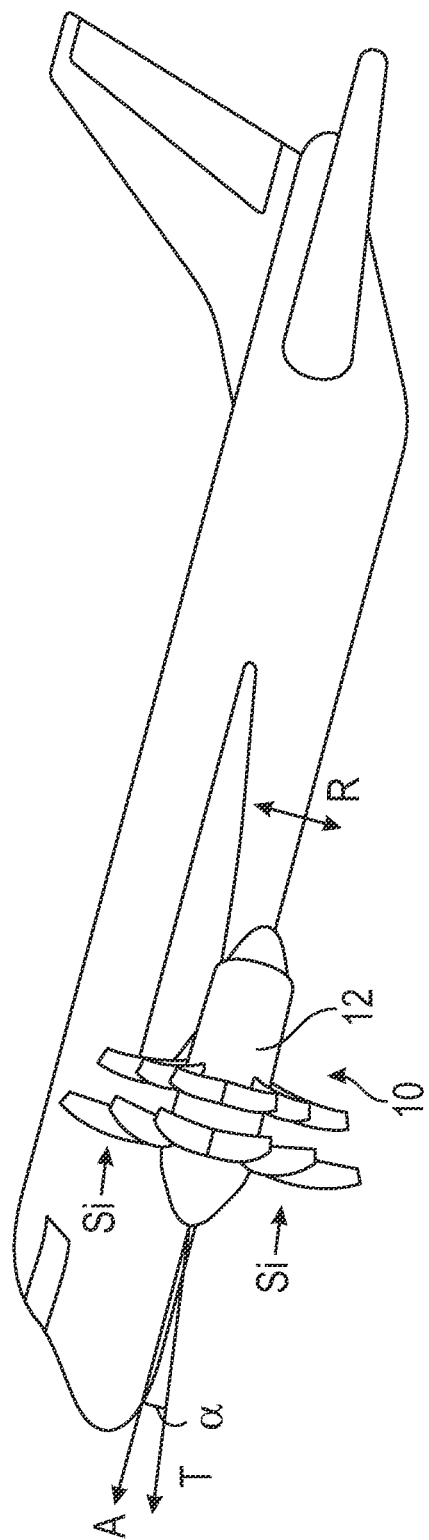
FIG. 2C shows a schematic view of an unducted, three-stream gas turbine engine, at a non-zero angle of attack, according to an embodiment of the present disclosure.

Referring now to FIGS. 2A to 2C, an unducted turbine engine, such as the gas turbine engine 10 discussed herein, has generally larger fan blades 54 than other configurations of turbine engines of comparable capacity. The fan blades 54 of the unducted gas turbine engine 10 are typically larger in both chord length and chord thickness. As such, the fan blades 54 of the unducted gas turbine engine 10 are more susceptible to the effects of a non-aligned incident air stream Si. The incident air stream Si may enter the flowpath of the gas turbine engine 10 in a direction that is not be aligned with the longitudinal centerline axis 12 of the gas turbine engine 10. Angle of incidence γ is the angle by which the incident air stream Si is misaligned, relative to the longitudinal centerline axis 16 of the turbine engine 10.

Certain flight conditions, and/or ambient conditions may affect the angle of incidence γ. For example, as shown in FIG. 2B, the longitudinal centerline axis 12 may be misaligned to the left or to the right of the direction of travel T by a non-zero yaw angle β. This may occur in a crosswind condition, or in a slip maneuver, and contribute to the resultant angle of incidence γ.

Alternatively or additionally, certain flight conditions, such as, for example, takeoff and landing situations, when the aircraft may be in a pitch up attitude, may cause a non-zero angle of attack α, as shown in FIG. 2C. The angle of attack α as shown in FIG. 2C is positive up, meaning that the forward end of the gas turbine engine 10 is oriented upward relative the direction of travel T, as viewed. While shown in a pitch up condition in FIG. 2C, flight conditions and operation may also dictate a pitch-down condition, which may also result in a non-zero angle of attack α.

The incident air flow Si is a flow of air initially contacting the fan blades 54 when entering the fan assembly 50. The magnitude of the incident air flow Si is determined by the airspeed of the aircraft, but also by ambient conditions. The angle of incidence γ of the incident air flow Si contacting the fan blades 54 is largely determined by the angle of attack α and yaw angle β but is also affected by ambient conditions and aircraft operational events. Consequently, the incident air flow Si may be substantially aligned with, in the opposite direction of, the direction of travel T. The incident air flow Si may, however, be misaligned by the angle of incidence γ, relative the direction of travel T. The magnitude of the angle of incidence γ may be exacerbated at relatively lower speeds, such as takeoff and landing, of an aircraft. Ambient conditions that effect the direction or the magnitude of the incident air flow Si may include stable winds or gusting winds in the up, down, or lateral directions (also referred to as updraft, downdraft, or crosswind, respectively), while examples of aircraft operational events include sudden aircraft maneuvering, and release of a payload.

FIG. 2A shows a schematic view of the gas turbine engine 10 of FIG. 1, at a non-zero angle of incidence γ. In an unducted configuration, as shown in the fan assembly 50, the incident air stream Si is not redirected or reoriented in any way prior to contact with each fan blade 54. As the fan assembly is not oriented along the direction of travel T, the fan blades 54 experience varying stresses due to the incident stream Si at different positions along their rotation.

In FIG. 2A, the gas turbine engine 10 is at a non-zero angle of incidence γ. Each fan blade 54 is in the uppermost position (also referred to as the twelve o'clock position), when aligned as shown by an upper blade 55. Conversely, each fan blade 54 is in the lowest position (also referred to as the six o'clock position), when aligned as shown by a lower blade 56. Similarly a leftmost blade 45 and a rightmost blade 46 are at corresponding three o'clock and nine o'clock positions, respectively. (FIG. 2B.) Leftmost blade 45 will experience different loading due to the effect of the incident air stream Si than the rightmost blade 46. The loading upon each fan blade 54 will cycle from that of the leftmost blade 45, to that of the rightmost blade 46 and back with each revolution of the primary fan 52. This cyclic loading cycle occurs once per revolution and is additionally referred to as "1P loading". 1P loading results in 1P cyclic vibrations, also referred to as "1P vibrations," at the frequency of the revolutions of the primary fan 52, beginning in the fan blade 54, and conducting through the connected structure of the gas turbine engine 10, via interconnected parts. As used herein, "1P loading" and "cyclic loading" refer to both the cyclic forces experienced by the fan blade 54 and conducted into the interconnected components of the gas turbine engine 10 and the aircraft, and to the cyclic vibrations in these components induced by the cyclic loading, or to both the cyclic forces and the cyclic vibrations. 1P loading may also result in undesirable and potentially destructive flutter of the fan blades. Undesirable 1P loading may even be detectable beyond the gas turbine engine, in the structure of the aircraft, by operators, and passengers.

Additionally, vibrations may be caused by distortion or nonuniformity in the inflow of the incident airstream Si. Also, individual differences between fan blades 54 may contribute to vibration. Inherent manufacturing variability in the fan blades 54 themselves may additionally contribute to vibration. For example, each individual blade 54 will have slightly different geometry as a result of the limits of manufacturing precision. Consequently, each blade 54 will generate a slightly different torque on the fan assembly 50, contributing to vibration.

Chord thickness of the fan blade 54, chord length of the fan blade 54, and pitch angle of the fan blade 54 relative to the fan blade centerline axis 57 exacerbate the effects of 1P loading. In the absence of features to align the incident air stream Si with the longitudinal centerline axis 12, such as a nacelle inlet, increases 1P loading. All of these features are present in the unducted configuration of gas turbine engine 10, relative to other turbine engines. Therefore, the gas turbine engine 10 is subjected to significant 1P loading.

1P loading may cause multiple adverse conditions in the gas turbine engine 10, including cyclic vibrations, cyclic stresses, and cyclic bending. The 1P cyclic loading causes the 1P cyclic vibrations and can cause harm elsewhere in the engine. 1P cyclic vibrations may also cause fatigue of engine components and may cause discomfort for operators or passengers.

In instances of greater angles of incidence γ or different angles of incidence γ, the 1P loading experienced by the fan blades 54 may be more pronounced. 1P loading may be more pronounced or less pronounced with increasing speed. Similar to the once per revolution 1P loading experienced as a result of angle of incidence γ, the blades 54 may undergo once per revolution 1P loading as a result of changes in the direction of ambient wind.

The terms "inner bearing" and "inner tapered roller bearing" as used in the detailed descriptions of fan blade mounting assemblies in FIGS. 3 to 14, refer to positions radially closer to the longitudinal centerline axis of the gas turbine engine 10, whereas the terms "outer bearing," "outer tapered roller bearing," and "outer roller bearing" refer to positions radially farther from the longitudinal centerline axis 12 of the gas turbine engine 10.

The term "outer race" as used in the detailed descriptions of FIGS. 4 to 8 refers to the outside of the bearing with respect to the bearing centerline axis (the fan blade centerline axis 57).

Figure 3:
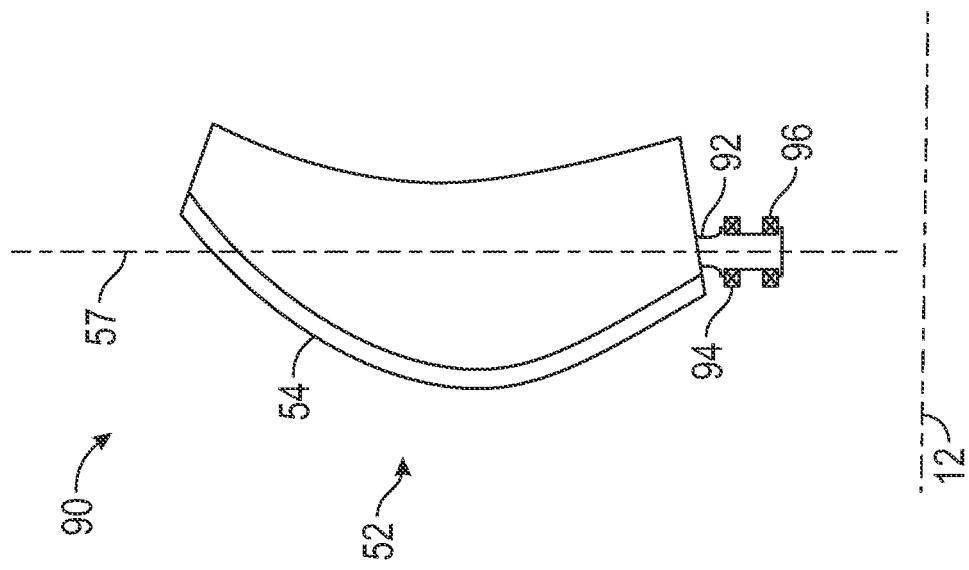
FIG. 3 is a schematic view of a fan blade assembly, according to an embodiment of the present invention.

FIG. 3 shows a fan blade assembly 90. The fan blade assembly 90 includes a fan blade 54 fixed to a fan blade root 92 and rotatable about a fan blade centerline axis 57.

As used in the following discussion of various fan blade mounting assemblies as shown in FIGS. 4 to 8, and various dampers as shown in FIGS. 9 to 14, the terms "axial" and "axially" refer to directions and orientations that extend substantially parallel to the fan blade centerline axis 57.

Moreover, the terms "radial" and "radially" refer to directions and orientations that extend substantially perpendicular to the fan blade centerline axis 57. In addition, as used herein, the terms "circumferential" and "circumferentially" refer to directions and orientations that extend arcuately about the fan blade centerline axis 57.

The fan blade assembly 90 includes an outer bearing 94 and an inner bearing 96. The outer bearing 94 and the inner bearing 96 facilitate rotation of the fan blades 54 about their respective fan blade centerline axis 57 as discussed with respect to FIG. 1. In all cases of 1P loading on the fan blades 54, the cyclic loads on the fan blades 54 conduct through mounting structure, including the fan blade root 92, the outer bearing 94, and the inner bearing 96, into the gas turbine engine 10 to which the fan blade assembly 90 is connected. This conducted cyclic loading may result in a vibration of the gas turbine engine 10, which in turn may have a negative effect on the performance of the gas turbine engine 10. Cyclic loading or resultant vibrations may additionally negatively impact the durability of the gas turbine engine 10 or the components thereof, through impact or fretting between adjacent components, through fatigue, and/or through other destructive mechanical events. A fan disk 412, 512, 612, and 712 (shown in FIGS. 4 to 7) is one such component susceptible to fatigue as a result of 1P loading, as the fan blade root 92 is mounted, via the outer bearing 94 and the inner bearing 96, to the fan disk 412, 512, 612, and 712. The fan disk 412, 512, 612, and 712, therefore, experiences 1P loading conducted from the fan blade assembly 90.

The support structure in and around the fan blade assembly 90 is generally constructed of stiff materials. Damping of vibrations is affected by both the geometric structure of the assembly and the materials of various components. Materials used in a fan blade assembly may include metal materials such as steels, aluminum, various alloys, or composite materials. Such generally stiff materials result in higher natural frequency of the overall structure. The inclusion of softer materials as may be applied in a damper will lower the natural frequency of the fan blade assembly 90. Various materials may additionally provide differing damping performance. A desired natural frequency may be achieved by selectively applying a relatively softer damper, as compared to the support structure. In this way, the overall assembly may be tuned to a desired natural frequency and damping that mitigates the 1P loading at the frequency of the fan blade assembly in operation.

The 1P loading experienced in the fan blade assembly 90 is conducted into the fan blade root 92. The 1P loading is greatest at the point closest to the center of the force, which occurs in the fan blade 54. Therefore, damping of the 1P vibrations through the fan blade root 92 is best accomplished at points of the fan blade root 92, closer to the fan blade. In the configuration shown in FIG. 3, therefore, 1P loading is greater at the outer bearing 94 than at the inner bearing 96.

Figure 4:
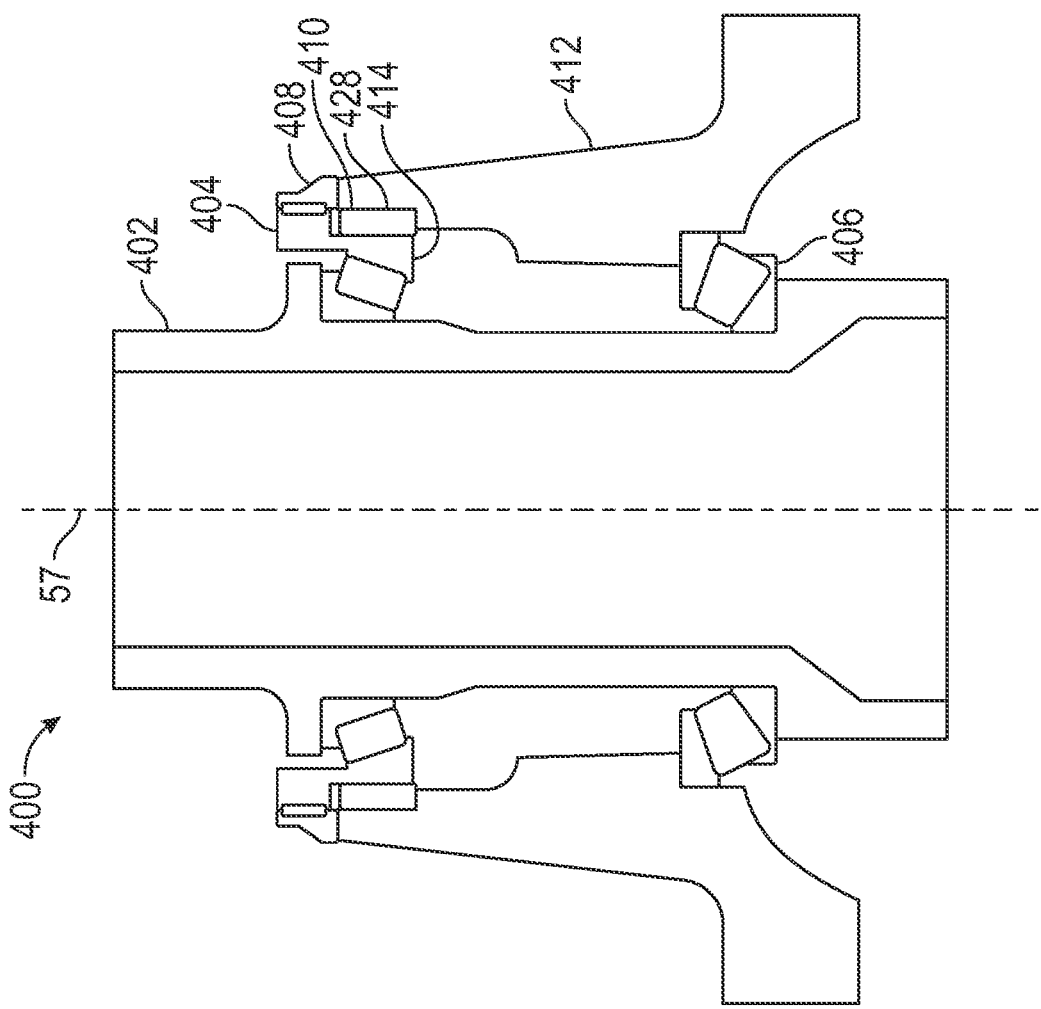
FIG. 4 is a schematic view of a fan blade mounting assembly, according to an embodiment of the present disclosure.

FIG. 4 shows an embodiment of a fan blade mounting assembly 400. The fan blade mounting assembly 400 employs an outer bearing, installed between a fan blade root 402 and the fan disk 412. The fan blade mounting assembly 400 also includes an inner bearing, installed between the fan blade root 402 and the fan disk 412. The outer bearing and the inner bearing may be an outer tapered roller bearing 404 and an inner tapered roller bearing 406, respectively. Together, the outer tapered roller bearing 404 and the inner tapered roller bearing 406 facilitate rotation of the fan blade root 402 relative the fan disk 412, about the fan blade centerline axis 57.

The outer tapered roller bearing 404 is secured by a lock nut 408. The lock nut 408 radially inwardly preloads the outer tapered roller bearing 404 by threading onto an outer race 414 of the outer tapered roller bearing 404. The orientation of the outer tapered roller bearing 404 and the preload on the outer tapered roller bearing 404 may be configured such that the outer tapered roller bearing 404 applies both a radially inward compressive load on the fan blade root 402 about the fan blade centerline axis 57, and an axially outward load along the fan blade centerline axis 57. The orientation of the inner tapered roller bearing 406 is configured such that the axial load along the fan blade centerline axis 57 in the fan blade root 402 from the lock nut 408 and the outer tapered roller bearing 404 is transmitted to the fan disk 412. Together, the outer tapered roller bearing 404 and the inner tapered roller bearing 406 facilitate rotation of the fan blade root 402 about the fan blade centerline axis 57. The compressive load applied by the lock nut 408 on the outer tapered roller bearing 404 is sized at least such that the conducted cyclic loading from the fan blade root 402 to the fan disk 412 does not reverse when 1P loads are at a cycle minimum. The lock nut 408 provides the aforementioned radial preloading only and does not apply an axial load on the fan disk 412. This prevents 1P loading conducting through the lock nut 408 to the fan disk 412.

The fan blade mounting assembly 400 additionally incorporates a damper 410. The damper 410 is generally cylindrical in shape and is positioned between the outer tapered roller bearing 404 and the fan disk 412. The vibrations damped by the damper 410 are (1P) radial vibrations, as the damper 410 is radially disposed between outer race 414 and the fan disk 412. The damping performance of the damper 410 may be due to the material or materials of the damper 410 and may be a result of the shape of components of the damper 410.

At least a portion of the 1P loading on the fan blade mounting assembly 400 is transmitted from the fan blade 54, through the fan blade root 402, through the outer tapered roller bearing 404, and eventually to the fan disk 412. The damper 410 is installed between the outer tapered roller bearing 404 and the fan disk 412 and damps the 1P loading experienced by the fan assembly 50. Damping the 1P loading on the fan blade assembly 90 by the damper 410 installed between the outer tapered roller bearing 404 and fan blade root 402 reduces the 1P loading experienced by the fan disk 412.

Reducing the 1P loading experienced by the fan disk 412 in turn reduces the 1P loading experienced by other portions of the gas turbine engine 10. Reducing the 1P loading in the fan disk 412 may further allow for improvements in the fan disk 412, as the fan disk 412 need not bear as much 1P loading, and, therefore, fatigue. Such improvements may include a smaller fan disk 412, with less mass, or may allow for the use of less expensive or less exotic materials. The reduction in 1P loading may similarly enable improvements to size, shape and materials elsewhere within the gas turbine engine 10 as those components will then experience lesser 1P loading. Additionally, as a result of the damped 1P loading, greater maintenance intervals may be possible throughout the gas turbine engine 10, relative to an otherwise equivalent turbine engine with an undamped fan blade assembly, resulting in lower operational costs.

The damper 410 is in radial alignment with the outer tapered roller bearing 404, such that 1P vibrations experienced by the fan blade mounting assembly 400 is transmitted through the outer tapered roller bearing 404 prior to damping by the damper 410. Damped 1P vibrations then applies to the fan disk 412 immediately after damping by the damper 410. In this configuration, the 1P vibrations experienced by the outer tapered roller bearing is undamped when reaching the outer tapered roller bearing 404.

In the configuration of FIG. 4, the damper is contained radially by the outer race 414 of the outer tapered roller bearing 404 and an annular step 428 in the fan disk 412. The damper 410 is contained axially by the annular step 428 in the fan disk 412 and the outer race 414 of the outer tapered roller bearing 404.

By the arrangement shown in FIG. 4, the inclusion of the damper 410 in the fan blade mounting assembly 400 requires no additional hardware and no increases to the overall envelope, relative to an otherwise equivalent fan blade mounting assembly without the damper 410. In fact, the overall envelope may actually be reduced through the inclusion of the damper 410 in the fan blade mounting assembly 400, as the fan disk 412 experiences a reduced 1P loading as a result of the inclusion of the damper 410, is therefore less susceptible to fatigue, and so may be reduced in size.

Figure 5:
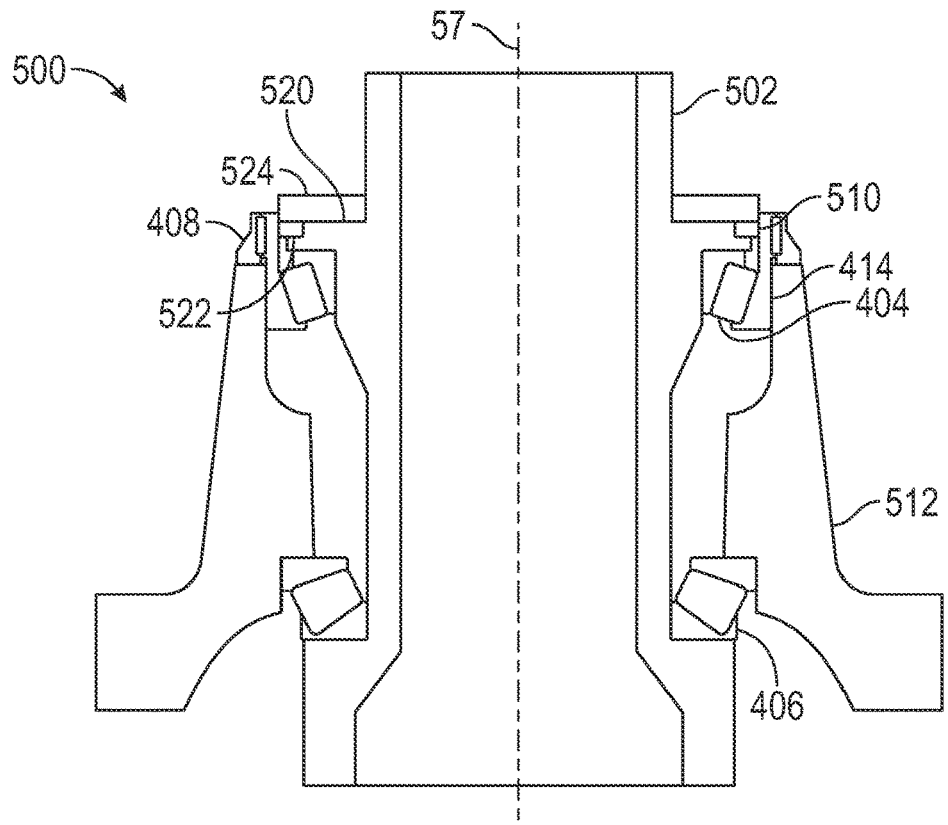
FIG. 5 is a schematic view of a fan blade mounting assembly, according to an embodiment of the present disclosure.

FIG. 5 shows an embodiment of a fan blade mounting assembly 500. Similar in configuration to the fan blade mounting assembly 400, the fan blade mounting assembly 500 includes an outer bearing and an inner bearing, installed between a fan blade root 502 and the fan disk 512, which may be the outer tapered roller bearing 404 and the inner tapered roller bearing 406, respectively, as discussed with respect to FIG. 4. Together, the outer tapered roller bearing 404 and the inner tapered roller bearing 406 facilitate rotation of the fan blade root 502 relative to the fan disk 512, about the fan blade centerline axis 57.

A damper 510 damps (1P) radial vibrations. The damper 510 is generally cylindrical in shape and is positioned radially between a fan blade root 502 and the outer tapered roller bearing 404. More specifically, the damper 510 is radially positioned between a flange 520 of the fan blade root 502, and the outer race 414 of the outer tapered roller bearing 404. The damper 510 damps 1P vibrations conducted radially from the fan blade root 602 into the damper 610, prior to conducting damped 1P vibrations to outer tapered roller bearing 404, which eventually conduct into the fan disk 512. Because the damper acts on the outer race 414 of the outer tapered roller bearing 404, the outer tapered roller bearing 404 must be radially preloaded by the lock nut 408, sufficiently to prevent the cyclic loading from unloading the outer tapered roller bearing 404. The lock nut 408 radially inwardly preloads the outer tapered roller bearing 404 by threading onto the outer race 414 of the outer tapered roller bearing 404. The lock nut 408 provides the aforementioned radial preloading only and does not apply an axial load on the fan disk 512. This prevents 1P loading conducting through the lock nut 408 to the fan disk 512.

Axially, the damper 510 is positioned between the flange 520 of the fan blade root 502 and the fan disk 512. More specifically, the damper 510 is axially positioned between an annular step 522 of the flange 520 and a retaining ring 524.

Figure 6:
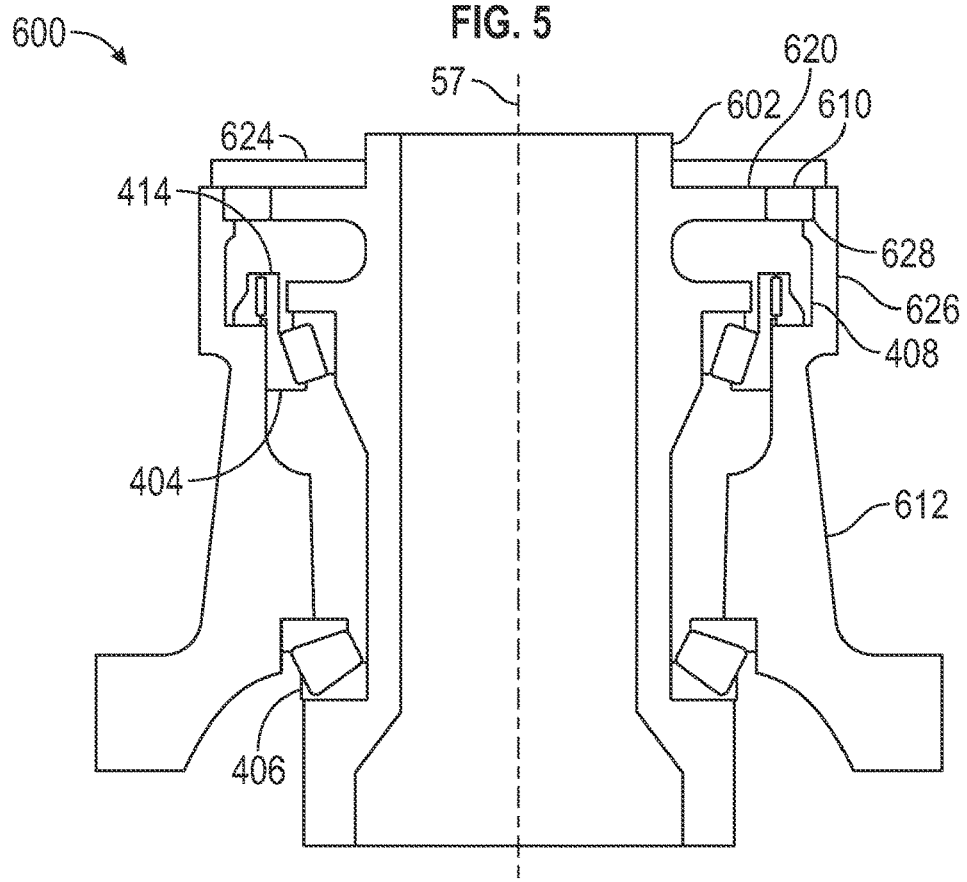
FIG. 6 is a schematic view of a fan blade mounting assembly, according to an embodiment of the present disclosure.
Figure 7:
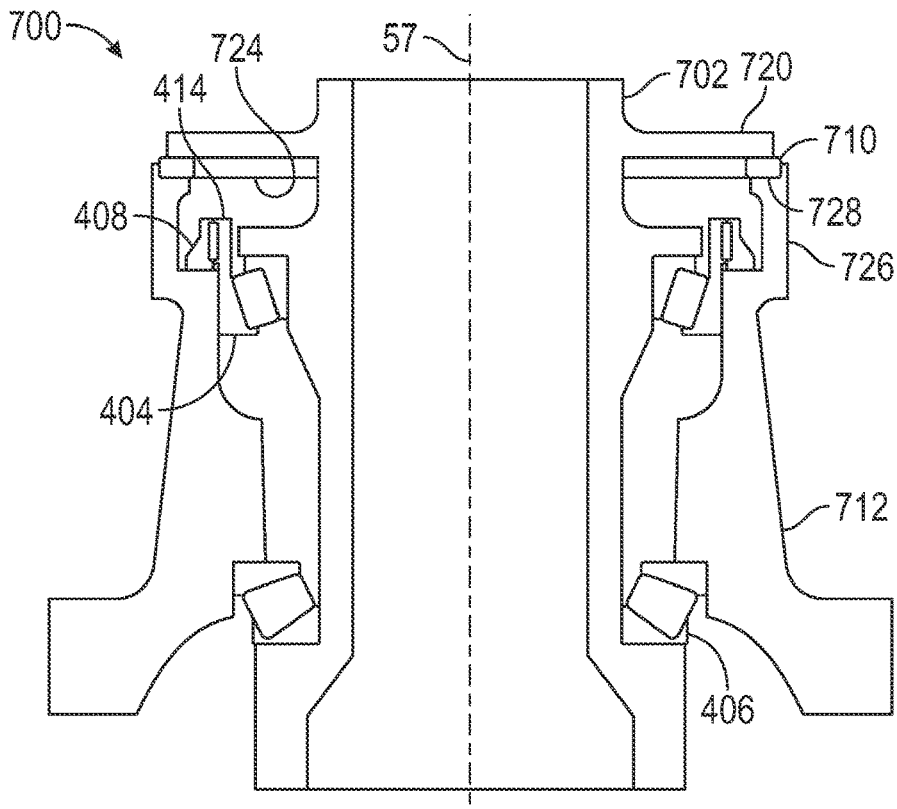
FIG. 7 is a schematic view of a fan blade mounting assembly, according to an embodiment of the present disclosure.
Figure 8:
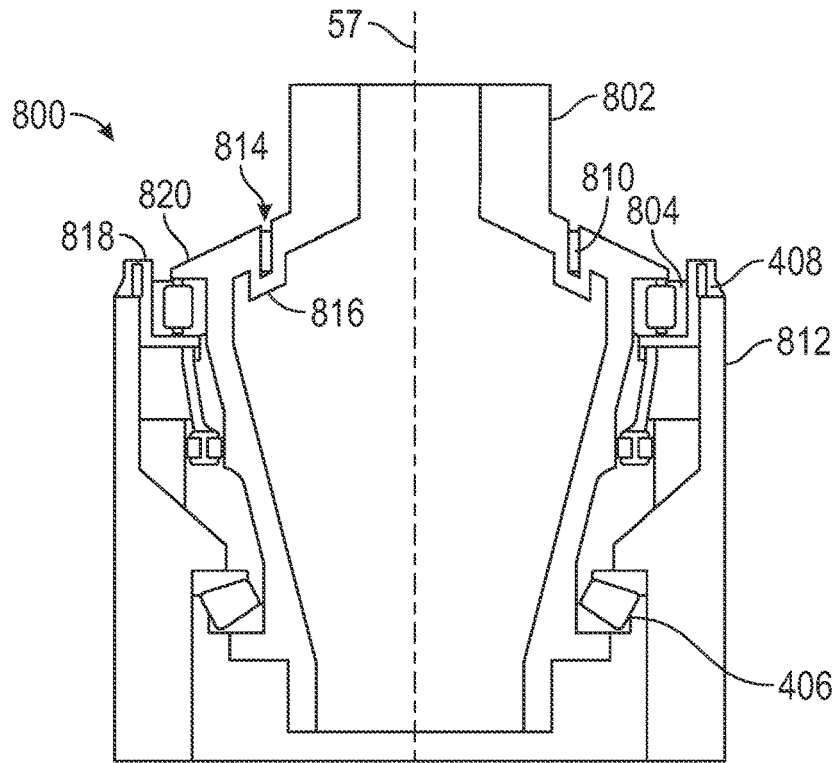
FIG. 8 is a schematic view of a fan blade mounting assembly, according to an embodiment of the present disclosure.

In this discussion, as well as the discussion of FIGS. 6 to 8, to follow, the retaining ring may be fastened to the fan blade roots by any appropriate joining process, including threading, press fitting, adhesion, or welding. Alternatively, the retaining ring may be secured via one or more fasteners, such as a bolt, a screw, or a rivet. Alternatively, additional methods of fastening may be contemplated, such that the retaining rings are secured to the fan blade roots to adequately hold the damper in place.

The damper 510 is in radial contact with the outer race 414 of the outer tapered roller bearing 404. However, the damper 510 acts at an end of the outer tapered roller bearing 404 closer to the fan blade 54 than the force applied to the fan disk 512 by the fan blade root 502 through the outer tapered roller bearing 404. The damper 510 is, therefore, effectively closer to the fan blade 54 (not shown) than the outer tapered roller bearing 404 and the inner tapered roller bearing 406.

While radially positioned between the flange 520 of the fan blade root 502 and the outer race 414, the damper 510 damps vibrations at an axial position between the fan blade and the outer tapered roller bearing 404. Consequently, the damper 510 reduces the vibrations prior to the vibrations reaching the outer tapered roller bearing 404 and the inner tapered roller bearing 406. This may mitigate vibratory damage and fatigue to the outer tapered roller bearing 404, the inner tapered roller bearing 406, and the fan disk 512.

FIG. 6 shows an embodiment of a fan blade mounting assembly 600. Similar in configuration to the fan blade mounting assembly 400, the fan blade mounting assembly 600 includes an outer bearing and an inner bearing, installed between a fan blade root 602 and the fan disk 612, which may be the outer tapered roller bearing 404 and the inner tapered roller bearing 406, respectively, as discussed with respect to FIG. 4. Together, the outer tapered roller bearing 404 and the inner tapered roller bearing 406 facilitate rotation of the fan blade root 602 relative to the fan disk 612, about the fan blade centerline axis 57.

A damper 610 damps (1P) radial vibrations. The damper 610 is generally cylindrical in shape and is positioned radially between the fan blade root 602 and the fan disk 612. More specifically, the damper 610 is radially positioned between a flange 620 of the fan blade root 602 and an extension portion 626 of the fan disk 612. Axially, the damper 610 is positioned between the fan disk 612 and a retaining ring 624. More specifically, the damper 610 is positioned between an annular step 628, inside the extension portion 626 of the fan disk 612, and the retaining ring 624.

The outer tapered roller bearing 404 is retained by the lock nut 408. The lock nut 408 radially inwardly preloads the outer tapered roller bearing 404. The lock nut 408 preloads the outer tapered roller bearing 404 by threading onto the outer race 414 of the outer tapered roller bearing 404. The compressive load applied by the lock nut 408 on the outer tapered roller bearing 404 is sized at least such that the conducted cyclic loading from the fan blade root 402 to the fan disk 412 does not reverse when at cycle minimum. The lock nut 408 applies a preload directly on the outer tapered roller bearing 404, and, consequently, on the inner tapered roller bearing 406 and the fan blade root 602, in a manner similar to that described with respect to FIG. 4. As configured in the fan blade mounting assembly 600, the preload on the outer tapered roller bearing 404 and the inner tapered roller bearing 406 does not preload the damper 610. The lock nut 408 provides the aforementioned radial preloading only and does not apply an axial load on the fan disk 612. This prevents 1P loading conducting through the lock nut 408 to the fan disk 612.

Radially positioned between the flange 620 of the fan blade root 602 and the extension portion 626 of the fan disk 612, the damper 610 damps vibrations at an axial position between the fan blade and the outer tapered roller bearing 404. Consequently, lesser vibrations reach the outer tapered roller bearing 404 and the inner tapered roller bearing 406, thus, mitigating vibratory damage and fatigue to the outer tapered roller bearing 404, the inner tapered roller bearing 406, and the fan disk 612.

FIG. 7 shows an embodiment of a fan blade mounting assembly 700. Similar in configuration to the fan blade mounting assembly 400, the fan blade mounting assembly 700 includes an outer bearing and an inner bearing installed between a fan blade root 702 and the fan disk 712, which may be the outer tapered roller bearing 404 and the inner tapered roller bearing 406, respectively, as discussed with respect to FIG. 4. Together, the outer tapered roller bearing 404 and the inner tapered roller bearing 406 facilitate rotation of the fan blade root 702 relative the fan disk 712, about the fan blade centerline axis 57.

The fan blade mounting assembly 700 includes a damper 710 installed radially between a retaining ring 724 and the fan disk 712. The damper 710 damps (1P) radial vibrations. The damper 710 is positioned radially between an annular step 728 inside of an extension portion 726 of the fan disk 712 and the retaining ring 724. Axially, the damper 710 is positioned between the fan disk 712 and a fan blade root 702. More specifically, the damper 710 is positioned axially between the annular step 728, inside the extension portion 726 of the fan disk 712, and a flange 720 of the fan blade root 702.

The outer tapered roller bearing 404 is retained with the lock nut 408. The lock nut 408 radially inwardly preloads the outer tapered roller bearing 404. The lock nut 408 preloads the outer tapered roller bearing 404 by threading onto the outer race 414 of the outer tapered roller bearing 404. The compressive load applied by the lock nut 408 on the outer tapered roller bearing 404 is sized at least such that the conducted cyclic loading from the fan blade root 402 to the fan disk 712 will not reverse when at cycle minimum. The lock nut 408 applies a preload directly on the outer tapered roller bearing 404, and, consequently, on the inner tapered roller bearing 406 and the fan blade root 702, in a manner similar to that described with respect to FIG. 4. As configured in the fan blade mounting assembly 700, the preload on the outer tapered roller bearing 404 and the inner tapered roller bearing 406 does not preload the damper 710. The lock nut 408 provides the aforementioned radial preloading only and does not apply an axial load on the fan disk 712. This prevents 1P loading conducting through the lock nut 408 to the fan disk 712.

Radially positioned between the retaining ring 724 and the annular step 728 of the extension portion 726 of the fan disk 712, the damper 710 damps vibrations at an axial position between the fan blade and the outer tapered roller bearing 404. Consequently, the vibrations are reduced prior to reaching the outer tapered roller bearing 404 and the inner tapered roller bearing 406, thus mitigating vibratory damage and fatigue to the outer tapered roller bearing 404, the inner tapered roller bearing 406, and the fan disk 712.

FIG. 8 shows an embodiment of a fan blade mounting assembly 800. Similar in configuration to the fan blade mounting assembly 400, the fan blade mounting assembly 800 includes an outer bearing and an inner bearing installed between a fan blade root 802 and a fan disk 812. The outer bearing may be an outer roller bearing 804. The inner bearing may be the inner tapered roller bearing 406, discussed with respect to FIG. 4. Together, the outer roller bearing 804 and the inner tapered roller bearing 406 facilitate rotation of the fan blade root 802 relative the fan disk 812, about the fan blade centerline axis 57.

The fan blade root 802 contains an annular gap 814. An inner portion 816 of the fan blade root 802 is positioned inboard of the annular gap 814. The inner portion 816 provides material continuity and provides stiffness to the fan blade root 802 in the area of the annular gap 814.

The fan blade mounting assembly 800 includes a damper 810. The damper 810 is installed in the annular gap 814 in the fan blade root 802. The damper 810 is retained radially inwardly and radially outwardly by the annular gap 814, the gap being sized appropriately to accept the damper 810 and to accommodate proper function of the damper 810. Axially, the damper 810 is retained inboard by the inner portion 816 of fan blade root 802. Optionally, the damper 810 may be retained outboard by a retaining ring (not shown).

An insert 818 with an L-shaped cross section is fitted to the inside of the fan disk 812. The outer roller bearing 804 is retained axially by a flange 820 on the fan blade root 802 and the insert 818. The outer roller bearing is retained radially by the fan blade root 802 and the insert 818. The lock nut 408 is fastened to the insert 818. The lock nut 408 radially compressively preloads the outer roller bearing 804 via the insert 818. In turn, the outer roller bearing 804 applies the radial compressive preload to the fan blade root 802, which, in turn, radially and compressively preloads the damper 810. The radially compressive preload applied by the lock nut 408 on the outer roller bearing 804 is sized at least such that the conducted cyclic loading from the fan blade root 802 to the fan disk 812 does not reverse when at cycle minimum. The lock nut 408 provides the aforementioned radial preloading only and does not apply an axial load on the fan disk 812. This prevents 1P loading conducting through the lock nut 408 to the fan disk 812.

Radially positioned within the annular gap 814, the damper 810 damps vibrations at an axial position between the fan blade and the outer roller bearing 804. Consequently, the damper 810 reduces vibrations prior to the vibrations reaching the outer roller bearing 804 and the inner tapered roller bearing 406, thus mitigating vibratory damage to the outer roller bearing 804, the inner tapered roller bearing 406, and the fan disk 812.

In the foregoing descriptions of the fan blade mounting assemblies 400, 500, 600, 700, and 800, various bearings are discussed, including tapered roller bearings and roller bearings, for mounting the fan blade roots 92, 402, 502, 602, 702, and 802 to the fan disks 412, 512, 612, 712, and 812. Alternative bearings are contemplated for facilitating rotation of the fan blade roots 92, 402, 502, 602, 702, and 802, relative to the fan disks 412, 512, 612, 712, and 812. Examples of alternative bearing types include rolling element bearings such as ball bearings, needle bearings, tapered roller bearings and cylindrical roller bearings. Still more alternative bearing types may include plain bearings such as journals and journal bearings (bushings) or may include fluid film bearings. Liquid or semi-viscous lubricants such as water, oil, or grease may lubricate the bearings. The bearings may be self-lubricating by incorporation of a fabric-type liner, a composite liner, or a dry-film lubrication. Liners may include polytetrafluoroethylene (PTFE) or other materials to facilitate relative motion within the function of a bearing, as may be contemplated. Rolling element bearings may be in a single row configuration, a double row configuration, or any other configuration of multiples as may be necessary to best facilitate the rotation of the fan blade roots 92, 402, 502, 602, 702, and 802. Bearing bushings (bushes) or races may be split or continuous. Bearings may be with or without one or more seals to mitigate the infiltration of debris or contaminants or to retain lubricant. Particular bearing configurations may be determined by the total loading of the system, which includes the 1P loading, the weight of the blades 54, and offset moments.

The following detailed descriptions of FIGS. 9 to 14 discuss various damper configurations, wherein the dampers are positioned between the outer tapered roller bearing 404 and the fan disk 412. The damper configurations of FIGS. 9 to 14 to follow, may, however, apply to the dampers 410, 510, 610, 710, and 810 previously mentioned with respect to the fan blade mounting assemblies 400, 500, 600, 700, and 800.

The terms "inner ring" and "inner annulus" as used in the detailed descriptions of dampers in FIGS. 9 to 14, refer to positions radially closer to the fan blade centerline axis 57, whereas the terms "outer ring" and "outer annulus" refer to positions radially farther from the fan blade centerline axis 57.

Figure 9:
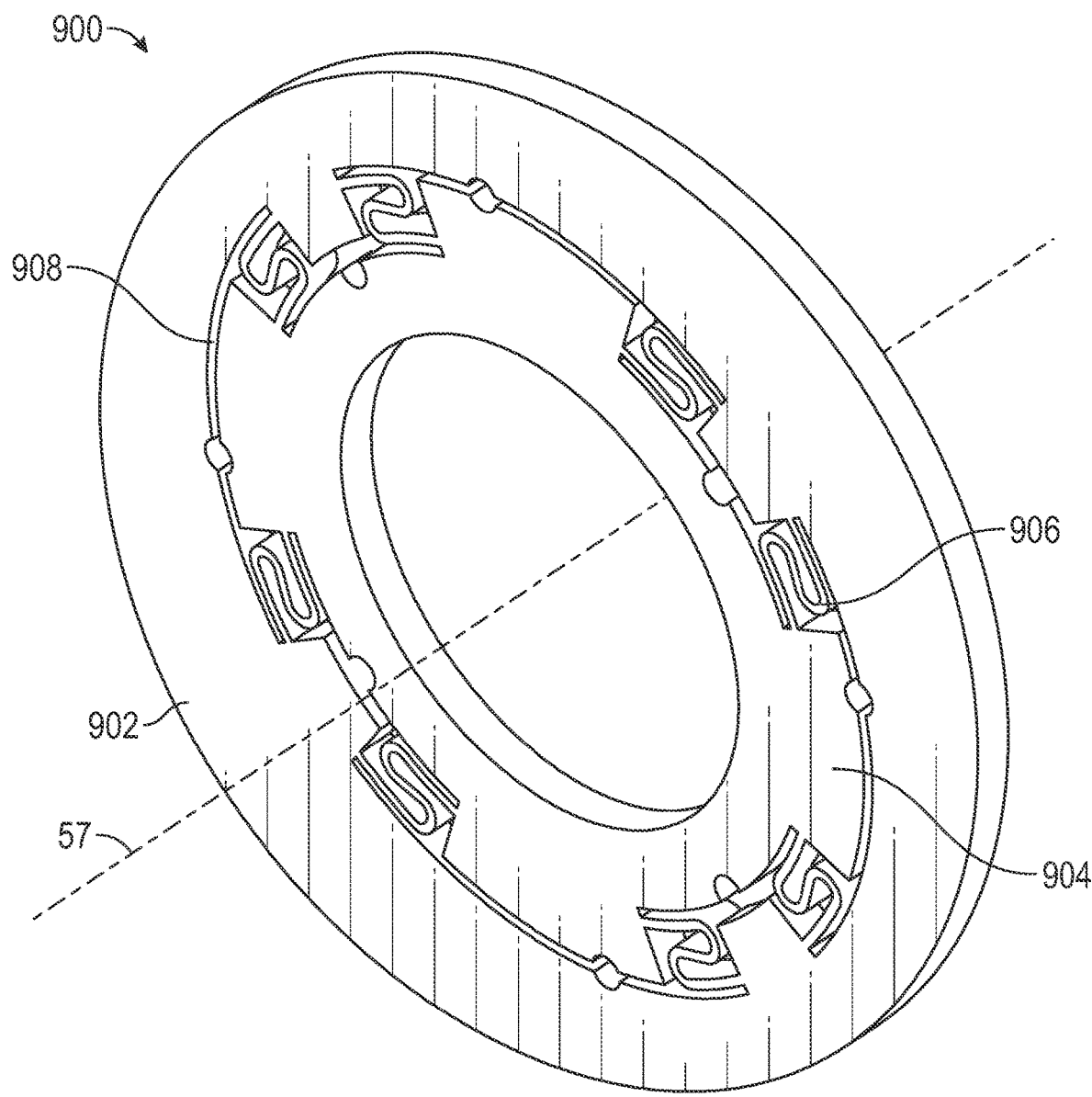
FIG. 9 is a schematic view of a squeeze film damper, according to an embodiment of the invention.

FIG. 9 shows an embodiment of a damper 900, also referred to as a squeeze film damper. The damper 900 has an outer ring 902 and an inner ring 904. An elastic body, also called a spring member 906, integrally connects the outer ring 902 and the inner ring 904, such that the outer ring 902, the spring member 906, and the inner ring 904 are a single continuous solid member. A fluid gap 908 separates the outer ring 902 and the inner ring 904. The fluid gap 908 is generally circumferential in shape and additionally surrounds the spring member 906. The fluid gap 908 contains a semi-viscous or a viscoelastic fluid. (Fluid not shown.)

The damper 900 allows for relative motion of the outer ring 902 and the inner ring 904 relative to one another. The spring member 906 resists the relative radial motion and has a radial displacement spring constant such that the greater the radial displacement of the inner ring 904 relative to the outer ring 902, the greater the resistance force applied on the outer ring 902 and the inner ring 904 by the spring member 906.

Additionally, as the inner ring 904 displaces relative to the outer ring 902, the fluid gap will constrict in an area where the inner ring 904 is closer to the outer ring 902. Consequently, on the diametrically opposite side, the fluid gap 908 will enlarge. Fluid in the fluid gap 908 must flow from the area of constriction to the area of enlargement, including through convolutions of the spring member 906. The viscosity of the fluid, and, thus, the resistance of the fluid to flowing from the area of constriction to the area of enlargement dampens radial oscillation and vibrations in the damper 900.

Together, the spring member 906 resisting relative motion and the viscosity of the fluid in the fluid gap 908 function as a spring-mass damper system, in damping radial vibrations through the damper 900.

With respect to the fan blade mounting assembly 400 of FIG. 4, the damper 900 may damp radial vibrations induced in the fan blade 54 due to flight conditions, subsequently carried through the fan blade root 402 and the outer tapered roller bearing 404, such that the vibrations finally conducted by the damper 900 to the fan disk 412 have reduced amplitude with respect to those conducted from the outer tapered roller bearing 404 to the damper 900.

FIG. 10 shows a damper 1000 positioned between the outer tapered roller bearing 404 and the fan disk 412 in the fan blade mounting assembly 400. The damper 1000 includes two compressible rings 1002. The compressible rings 1002 are generally annular in shape. A material property of the compressible ring 1002 such as hardness or compressibility may facilitate damping of the 1P vibrations. The compressible rings 1002 are constructed of a relatively soft and compressible material such as rubber.

With respect to the fan blade mounting assembly 400 of FIG. 4, the damper 1000 may damp radial vibrations induced in the fan blade 54 due to flight conditions, and subsequently carried through the fan blade root 402 and the outer tapered roller bearing 404. The damper 1000 conducts vibrations through the compressible rings 1002 to the fan disk 412. The vibrations conducted by the damper 1000 to the fan disk 412 have a reduced amplitude with respect to the vibrations transmitted by the outer tapered roller bearing 404 to the damper 1000.

Damper 1000 as illustrated in FIG. 10 contains two compressible rings 1002. The compressible rings 1002 may have known properties, such as compressibility, and absorbance of vibrations. Together, these properties yield damping performance. The count of compressible rings 1002 may be modified to suit the particular application of the damper 1000. The embodiment of FIG. 10 shows two compressible rings 1002, however, damper 1000 may include more, or fewer compressible rings 1002, in order to achieve the targeted damping performance.

FIG. 11 shows a damper 1100 positioned between the outer tapered roller bearing 404 and the fan disk 412 in the fan blade mounting assembly 400. The damper 1100 consists of an annular metallic ring 1104 with an inner annulus 1106 and an outer annulus 1108, connected by an annular bend 1110. The metallic ring 1104 is generally U-shaped, or U-shaped in cross section, with an inner annulus thickness 1112, an outer annulus thickness 1114, and a gap thickness 1116. The metallic ring 1104 may be constructed of a metallic material such steel, or a titanium-nickel alloy. Alternatively, the metallic ring 1104 may be constructed of alternative appropriate metallic materials as may serve the application, including a shape memory alloy. Shape memory alloys are known to provide a damping effect superior to that of other metals and alloys. Additionally, the shape memory alloy generally permits deflection and deformation at relatively colder temperatures and tends to return to its neutral shape when heated.

The geometry of the generally U-shaped cross section, or the U-shaped cross section allows for deformation of the damper 1100. Specifically, the inner annulus 1106 may displace relative to the outer annulus 1108 under radial load and vibrations. The annular bend 1110 resists displacement of the inner annulus 1106 relative to the outer annulus 1108 and causes the metallic ring to return to the neutral shape. If the metallic ring 1104 is constructed of a shape memory alloy, the metallic ring 1104 may additionally provide a useful damping effect. The springlike resistance to deflection and the damping behavior of the metallic ring 1104 provide a spring-mass damper function in the radial direction.

With respect to the fan blade mounting assembly 400 of FIG. 4, the damper 1100 damps radial vibrations induced in the fan blade 54 due to flight conditions, and subsequently carried through the fan blade root 402 and the outer tapered roller bearing 404. The damper 1100 conducts vibrations through the metallic ring 1104 to the fan disk 412. The vibrations conducted by the damper 1100 to the fan disk 412 have a reduced amplitude with respect to the vibrations transmitted by the outer tapered roller bearing 404 to the damper 1100.

FIG. 12 shows a damper 1200 positioned between the outer tapered roller bearing 404 and the fan disk 412 in the fan blade mounting assembly 400, consisting both of the compressible rings 1002 and the metallic ring 1104. The one or more compressible rings 1002 are located between the inner annulus 1106 and the outer annulus 1108 of the metallic ring 1104. The resistance of the metallic ring 1104 to displacement between the inner annulus 1106 and the outer annulus 1108 functions as a spring in the radial direction. The relative softness and vibratory absorbent properties of the compressible rings 1002 function as a damper. Together, the compressible rings 1002 and the metallic ring function as a radial spring-mass damper system, to damp radial loads and vibrations.

With respect to the fan blade mounting assembly 400 of FIG. 4, the damper 1200 damps radial vibrations induced in the fan blade 54 due to flight conditions, and subsequently carried through the fan blade root 402 and the outer tapered roller bearing 404. The damper 1200 conducts vibrations through the metallic ring 1104 and the compressible rings 1002 to the fan disk 412. The vibrations conducted by the damper 1200 to the fan disk 412 have a reduced amplitude with respect to the vibrations transmitted by the outer tapered roller bearing 404 to the damper 1200.

FIG. 13 shows a damper 1300 positioned between the outer tapered roller bearing 404 and the fan disk 412 in the fan blade mounting assembly 400, including both the metallic ring 1104 and one or more hydraulic dampers 1306, acting radially and arrayed circumferentially about the fan blade axis 57. The one or more hydraulic dampers 1306 are located between the inner annulus 1106 and the outer annulus 1108 of the metallic ring 1104. The resistance of the metallic ring 1104 to displacement between the inner annulus 1106 and the outer annulus 1108 functions as a spring in the radial direction. The hydraulic dampers 1306 consist of multiple sections, including a cylinder 1308 and a piston 1310, acting in the radial direction. Together the resistance to deflection of the metallic ring 1104 and the damping of the hydraulic damper 1306 function as a spring mass damper system, to damp radial loads and vibrations.

With respect to the fan blade mounting assembly 400 of FIG. 4, the damper 1300 damps radial vibrations induced in the fan blade 54 due to flight conditions, and subsequently carried through the fan blade root 402 and the outer tapered roller bearing 404. The damper 1300 conducts vibrations through the metallic ring 1104, the cylinder 1308 and the piston 1310, to the fan disk 412. The vibrations conducted by the damper 1300 to the fan disk 412 have a reduced amplitude with respect to the vibrations transmitted by the outer tapered roller bearing 404 to the damper 1300.

FIG. 14 shows a damper 1400 positioned between the outer tapered roller bearing 404 and the fan disk 412 in the fan blade mounting assembly 400, consisting both of the metallic ring 1104 and a wave ring 1402. The wave ring 1402 has a wavy cross-sectional shape and is constructed of a shape memory alloy. The shape memory alloys of both the metallic ring 1104 and the wave ring 1402 each behave as a spring-mass damper system, as described previously. In the wave ring 1402, the wavy shape and the shape memory alloy material function in combination such that once deflected, as may be caused by the inner annulus 1106 displacing radially relative the outer annulus 1108, the wave ring 1402 will exert a reactionary force on the inner annulus 1106 and the outer annulus 1108, in order to return to its neutral shape while damping radial vibrations. In this way, the wave ring 1402 functions like a spring. If constructed of a shape memory alloy, the wave ring 1402 will also damp radial vibration. By resisting radial deflection and damping radial vibration, the wave ring 1402 functions as a spring-mass damper system. If the metallic ring 1104 is constructed of a second shape memory alloy, it may also function as a spring-mass damper system in the radial direction, as previously described, providing performance at different frequencies from the shape memory alloy of the wave ring 1402, which expands the overall range of frequencies damped by the damper 1400.

With respect to the fan blade mounting assembly 400 of FIG. 4, the damper 1400 damps radial vibrations induced in the fan blade 54 due to flight conditions, subsequently carried through the fan blade root 402 and the outer tapered roller bearing 404. The damper 1300 conducts vibrations through the metallic ring 1104 and the wave ring 1402. The vibrations conducted by the damper 1400 to the fan disk 412 have a reduced amplitude with respect to the vibrations transmitted by the outer tapered roller bearing 404 to the damper 1400.

In the foregoing discussion related to various dampers in FIGS. 9 to 14, the dampers 900, 1000, 1100, 1200, 1300, and 1400 are described in the context of the fan blade mounting assembly 400. This context is for example only. The dampers 900, 1000, 1100, 1200, 1300, and 1400 are non-exclusive to any particular configuration of the fan blade mounting assembly 400, 500, 600, 700, and 800. Any damper 900, 1000, 1100, 1200, 1300, and 1400 may be applied to any one or more of the embodiments of the fan blade mounting assemblies 400, 500, 600, 700, and 800 shown in FIGS. 4 to 7. Further, additional configurations of dampers not contemplated herein may be equivalently applied to any of the fan blade mounting assemblies 400, 500, 600, 700, and 800, but still provide the function and performance of the fan blade mounting assemblies 400, 500, 600, 700, and 800, damped as described.

In the foregoing discussion, various fan blade mounting assemblies 400, 500, 600, 700, and 800 facilitate rotation of the fan blade 54, relative to the fan blade centerline axis 57. This rotatability in a propeller or a fan of an aircraft engine is referred to as "variable pitch," and is enabled in part by the various bearings discussed. Engines with non-rotatable propellers or fan blades, referred to as "fixed pitch," may also experience 1P loading. As such, the various configurations of fan blade mounting assemblies 400, 500, 600, 700, and 800 and the various configuration of dampers 900, 1000, 1100, 1200, 1300, and 1400 are similarly contemplated without bearings, in order to still mitigate the effects of the 1P loading. In configurations without bearings, the dampers nonetheless mitigate undesirable vibrations of 1P loading.

Blade mounting assemblies 400, 500, 600, 700, and 800 experience 1P vibration due to 1P loading, and due to factors including aircraft attitude, individual blade 54 differences, and ambient conditions. The 1P cyclic vibrations may cause fatigue of gas turbine engine 10 components and may cause discomfort for operators or passengers. The fan blade mounting assemblies 400, 500, 600, 700, and 800 reduce the 1P vibrations by the inclusion of the dampers 410, 510, 610, and 710 between the fan blades 54 and the fan disks 412, 512, 612, and 712. The arrangements of the fan blade mounting assemblies 400, 500, 600, 700, and 800, therefore, reduce fatigue of gas turbine engine 10 components and improves comfort for operators or passengers. Reduced fatigue may improve the service life or reduce the cost of components of the gas turbine engine 10. Dampers 900, 1000, 1100, 1200, 1300, and 1400 may be employed within the fan blade mounting assemblies 400, 500, 600, 700, and 800 to reduce the vibrations.

The dampers 900, 1000, 1100, 1200, 1300, and 1400 provide for reduced blade 54 loading, increased service life of the blade 54 due to reduced vibrational stresses, and increased life to the overall fan assembly 50 and its constituent components. Reduced vibrational stresses additionally enable the use of lighter weight structures and materials.

Further aspects of the present disclosure are provided by the subject matter of the following clauses.

A turbine engine experiencing 1P vibrations, the turbine engine comprising a turbo-engine having a longitudinal centerline axis, a compressor that compresses air, a combustor that receives fuel and the compressed air, and combusts the compressed air and the fuel to generate combustion gases, a turbine that receives the combustion gases and rotates, and a fan assembly, driven by the turbine, that rotates about the longitudinal centerline axis comprising a fan disk aligned with the longitudinal centerline axis, a fan blade with a fan blade centerline axis orthogonal to the longitudinal centerline axis, the fan blade subjected to 1P loading and generating the 1P vibrations, a fan blade root fixed to the fan blade and connected to the fan disk, the fan blade root aligned with the fan blade centerline axis and conducting the 1P vibrations, and a damper positioned radially between the fan blade root and the fan disk, damping the 1P vibrations, such that the 1P vibrations in the fan disk have a reduced amplitude, with respect to the 1P vibrations in the fan blade root.

The turbine engine of the preceding clause, further comprising at least one shaft rotationally connecting the compressor, the turbine, and the fan disk, wherein the rotation of the turbine causes rotation of the fan assembly, and the 1P vibrations are conducted through the shaft to the compressor and the turbine.

The turbine engine of any preceding clause, further comprising a first shaft, rotationally fixed to the compressor and the turbine, a gearbox assembly, and a second shaft rotationally fixed to the fan assembly, wherein the first shaft and the second shaft are attached to the gearbox assembly such that a rotational speed of the second shaft is reduced relative to a rotational speed of the first shaft.

The turbine engine of any preceding clause, wherein the fan assembly is unducted.

The turbine engine of any preceding clause, further comprising a retaining ring fastened to the fan blade root, positioning the damper relative to the fan blade root axially, radially, or axially and radially.

The turbine engine of any preceding clause, wherein the fan blade root comprises an annular gap and the damper is positioned within the annular gap.

The turbine engine of any preceding clause, wherein the fan blade root comprises a flange for positioning for the damper radially, axially, or radially and axially.

The turbine engine of any preceding clause, wherein the fan disk comprises an extension portion that positions the damper axially, radially, or axially and radially.

The turbine engine of any preceding clause, wherein the damper is a squeeze film damper comprising an inner ring, an outer ring, a spring member connecting the inner ring and the outer ring, and a fluid gap containing a semi-viscous or a viscoelastic fluid, wherein the squeeze film damper permits displacement of the inner ring relative to the outer ring, and the displacement is resisted by the spring member and by a flow of the semi-viscous or the viscoelastic fluid.

The turbine engine of any preceding clause, wherein the damper comprises at least one compressible ring.

The turbine engine of any preceding clause, further comprising at least one bearing between the fan blade root and the fan disk that facilitates rotation of the fan blade root and the fan blade about the fan blade centerline axis relative to the fan disk, the at least one bearing conducting the 1P vibrations.

The turbine engine of the preceding clause, wherein the at least one bearing is a first bearing, the turbine engine further comprises a second bearing between the fan blade root and the fan disk that facilitates the rotation of the fan blade root and the fan blade about the fan blade centerline axis relative to the fan disk, and the damper is outboard of both the first bearing and the second bearing.

The turbine engine of any preceding clause, wherein the damper is positioned radially between the fan blade root and the at least one bearing such that the 1P vibrations conducted by the at least one bearing have a reduced amplitude with respect to the 1P vibrations conducted by the fan blade root.

The turbine engine of any preceding clause, wherein the damper is positioned radially between the at least one bearing and the fan disk such that the 1P vibrations conducted by the fan disk have reduced amplitude with respect to the 1P vibrations conducted by the at least one bearing.

The turbine engine of any preceding clause, wherein a lock nut applies a radially inward preload on the at least one bearing, the damper, or the at least one bearing and the damper, but does not apply an axial load on the fan disk and does not conduct 1P vibrations to the fan disk.

The turbine engine of any preceding clause, wherein the damper comprises a metallic ring having a generally U-shaped cross section or a U-shaped cross section.

The turbine engine of the preceding clause, wherein the metallic ring having a generally U-shaped cross section or a U-shaped cross section is made of a steel, a titanium-nickel alloy, or a shape memory alloy.

The turbine engine of any preceding clause, wherein the damper further comprises one or more compressible rings.

The turbine engine of any preceding clause, wherein the damper comprises a wave ring constructed of a shape memory alloy.

The turbine engine of any preceding clause, wherein the damper further comprises at least one hydraulic damper.

The turbine engine of the preceding clause, wherein the at least one hydraulic damper comprises a cylinder and a piston.

The turbine engine of any preceding clause, wherein the at least one bearing is a tapered roller bearing.

The turbine engine of any preceding clause, wherein the at least one bearing is a roller bearing.

The turbine engine of any preceding clause, further comprising a retaining ring fastened to the fan blade root, the retaining ring radially positioning the damper relative to the fan blade root and conducting the 1P vibrations radially from the fan blade root to the damper.

The turbine engine of any preceding clause, the fan blade root comprising a flange that radially positions the damper relative to the fan blade root, the flange conducting the 1P vibrations radially between the fan blade root and the damper.

The turbine engine of any preceding clause, the fan disk comprising an extension portion that radially positions the damper relative to the fan blade root, the extension portion conducting 1P vibrations from the damper, the 1P vibrations from the damper having a reduced amplitude with respect to 1P vibrations in the fan blade root.

The turbine engine of any preceding clause, wherein the shape memory alloy is a first shape memory alloy and the damper further comprises a metallic ring having a generally U-shaped cross section or a U-shaped cross section made of a second shape memory alloy.

A fan assembly experiencing 1P vibrations, the fan assembly that rotates about a longitudinal centerline axis, the fan assembly comprising a fan disk aligned with the longitudinal centerline axis, a fan blade with a fan blade centerline axis orthogonal to the longitudinal centerline axis, the fan blade subjected to 1P loading and generating the 1P vibrations, a fan blade root fixed to the fan blade and connected to the fan disk, the fan blade root aligned with the fan blade centerline axis and conducting the 1P vibrations, and a damper positioned radially between the fan blade root and the fan disk, damping the 1P vibrations, such that the 1P vibrations in the fan disk have a reduced amplitude, with respect to the 1P vibrations in the fan blade root.

The fan assembly of the preceding clause, wherein the fan assembly is unducted.

The fan assembly of any preceding clause, further comprising a retaining ring fastened to the fan blade root, positioning the damper relative to the fan blade root axially, radially, or axially and radially.

The fan assembly of any preceding clause, wherein the fan blade root comprises an annular gap and the damper is positioned within the annular gap.

The fan assembly of any preceding clause, wherein the fan blade root comprises a flange for positioning for the damper radially, axially, or radially and axially.

The fan assembly of any preceding clause, wherein the fan disk comprises an extension portion that positions the damper axially, radially, or axially and radially.

The fan assembly of any preceding clause, wherein the damper is a squeeze film damper comprising an inner ring, an outer ring, a spring member connecting the inner ring and the outer ring, and a fluid gap containing a semi-viscous or a viscoelastic fluid, wherein the squeeze film damper permits displacement of the inner ring relative to the outer ring, and the displacement is resisted by the spring member and by a flow of the semi-viscous or the viscoelastic fluid.

The fan assembly of any preceding clause, wherein the damper comprises at least one compressible ring.

The fan assembly of any preceding clause, further comprising at least one bearing between the fan blade root and the fan disk that facilitates rotation of the fan blade root and the fan blade about the fan blade centerline axis relative to the fan disk, the at least one bearing conducting the 1P vibrations.

The fan assembly of the preceding clause, wherein the at least one bearing is a first bearing, the turbine engine further comprises a second bearing between the fan blade root and the fan disk that facilitates the rotation of the fan blade root and the fan blade about the fan blade centerline axis relative to the fan disk, and the damper is outboard of both the first bearing and the second bearing.

The fan assembly of any preceding clause, wherein the damper is positioned radially between the fan blade root and the at least one bearing such that the 1P vibrations conducted by the at least one bearing have a reduced amplitude with respect to the 1P vibrations conducted by the fan blade root.

The fan assembly of any preceding clause, wherein the damper is positioned radially between the at least one bearing and the fan disk such that the 1P vibrations conducted by the fan disk have reduced amplitude with respect to the 1P vibrations conducted by the at least one bearing.

The fan assembly of any preceding clause, wherein a lock nut applies a radially inward preload on the at least one bearing, the damper, or the at least one bearing and the damper, but does not apply an axial load on the fan disk and does not conduct 1P vibrations to the fan disk.

The fan assembly of any preceding clause, wherein the damper comprises a metallic ring having a generally U-shaped cross section or a U-shaped cross section.

The fan assembly of the preceding clause, wherein the metallic ring having a generally U-shaped cross section or a U-shaped cross section is made of a steel, a titanium-nickel alloy, or a shape memory alloy.

The fan assembly of any preceding clause, wherein the damper further comprises one or more compressible rings.

The fan assembly of any preceding clause, wherein the damper comprises a wave ring constructed of a shape memory alloy.

The fan assembly of any preceding clause, wherein the damper further comprises at least one hydraulic damper.

The fan assembly of the preceding clause, wherein the at least one hydraulic damper comprises a cylinder and a piston.

The fan assembly of any preceding clause, wherein the at least one bearing is a tapered roller bearing.

The fan assembly of any preceding clause, wherein the at least one bearing is a roller bearing.

The fan assembly of any preceding clause, further comprising a retaining ring fastened to the fan blade root, the retaining ring radially positioning the damper relative to the fan blade root and conducting the 1P vibrations radially from the fan blade root to the damper.

The fan assembly of any preceding clause, the fan blade root comprising a flange that radially positions the damper relative to the fan blade root, the flange conducting the 1P vibrations radially between the fan blade root and the damper.

The fan assembly of any preceding clause, the fan disk comprising an extension portion that radially positions the damper relative to the fan blade root, the extension portion conducting 1P vibrations from the damper, the 1P vibrations from the damper having a reduced amplitude with respect to 1P vibrations in the fan blade root.

The fan assembly of any preceding clause, wherein the shape memory alloy is a first shape memory alloy and the damper further comprises a metallic ring having a generally U-shaped cross section made of a second shape memory alloy.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A turbine engine experiencing 1P vibrations, the turbine engine comprising:
   a turbo-engine having a longitudinal centerline axis;
   a compressor generates compressed air;
   a combustor that receives fuel and the compressed air, and combusts the compressed air and the fuel to generate combustion gases;
   a turbine that receives the combustion gases and rotates; and
   a fan assembly, driven by the turbine, that rotates about the longitudinal centerline axis, the fan assembly comprising:
   a fan disk aligned with the longitudinal centerline axis;
   a fan blade with a fan blade centerline axis orthogonal to the longitudinal centerline axis, the fan blade subjected to 1P loading and generating the 1P vibrations;
   a fan blade root fixed to the fan blade and connected to the fan disk, the fan blade root aligned with the fan blade centerline axis and conducting the 1P vibrations; and
   a damper having a side aligned with the fan blade centerline axis and being positioned radially between the fan blade root and the fan disk, the damper damping the 1P vibrations, such that the 1P vibrations in the fan disk have a reduced amplitude with respect to the 1P vibrations in the fan blade root.

2. The turbine engine of claim 1, further comprising:
a first shaft, rotationally fixed to the compressor and the turbine;
a gearbox assembly; and
a second shaft rotationally fixed to the fan assembly,
wherein the first shaft and the second shaft are attached to the gearbox assembly such that a rotational speed of the second shaft is reduced relative to a rotational speed of the first shaft.

3. The turbine engine of claim 1, wherein the fan assembly is unducted.

4. The turbine engine of claim 1, further comprising a retaining ring fastened to the fan blade root, positioning the damper relative to the fan blade root axially, radially, or axially and radially.

5. The turbine engine of claim 1, wherein the fan blade root comprises an annular gap and the damper is positioned within the annular gap.

6. The turbine engine of claim 1, wherein the fan blade root comprises a flange for positioning for the damper radially, axially, or radially and axially.

7. The turbine engine of claim 1, wherein the fan disk comprises an extension portion that positions the damper axially, radially, or axially and radially.

8. The turbine engine of claim 1, wherein the damper is a squeeze film damper comprising:
an inner ring;
an outer ring;
a spring member connecting the inner ring and the outer ring; and
a fluid gap containing a semi-viscous or a viscoelastic fluid,
wherein the squeeze film damper permits displacement of the inner ring relative to the outer ring, and the displacement is resisted by the spring member and by a flow of the semi-viscous or the viscoelastic fluid.

9. The turbine engine of claim 1, wherein the damper comprises at least one compressible ring.

10. The turbine engine of claim 1, further comprising at least one bearing between the fan blade root and the fan disk that facilitates rotation of the fan blade root and the fan blade about the fan blade centerline axis relative to the fan disk, the at least one bearing conducting the 1P vibrations.

11. The turbine engine of claim 10, wherein the at least one bearing is a first bearing, the turbine engine further comprises a second bearing between the fan blade root and the fan disk that facilitates the rotation of the fan blade root and the fan blade about the fan blade centerline axis relative to the fan disk, and the damper is outboard of both the first bearing and the second bearing.

12. The turbine engine of claim 10, wherein the damper is positioned radially between the fan blade root and the at least one bearing such that the 1P vibrations conducted by the at least one bearing have a reduced amplitude with respect to the 1P vibrations conducted by the fan blade root.

13. The turbine engine of claim 10, wherein the damper is positioned radially between the at least one bearing and the fan disk such that the 1P vibrations conducted by the fan disk have reduced amplitude with respect to the 1P vibrations conducted by the at least one bearing.

14. The turbine engine of claim 10, wherein a lock nut applies a radially inward preload on the at least one bearing, the damper, or the at least one bearing and the damper, but does not apply an axial load on the fan disk and does not conduct 1P vibrations to the fan disk.

15. The turbine engine of claim 1, wherein the damper comprises a metallic ring having a generally U-shaped cross section or a U-shaped cross section.

16. The turbine engine of claim 15, wherein the metallic ring having a generally U-shaped cross section or a U-shaped cross section is made of a steel, a titanium-nickel alloy, or a shape memory alloy.

17. The turbine engine of claim 15, wherein the damper further comprises one or more compressible rings.

18. The turbine engine of claim 15, wherein the damper comprises a wave ring constructed of a shape memory alloy.

19. The turbine engine of claim 15, wherein the damper further comprises at least one hydraulic damper.

20. The turbine engine of claim 19, wherein the at least one hydraulic damper comprises a cylinder and a piston.

* * * * *